US008028114B2

(12) United States Patent
Kyusojin et al.

(10) Patent No.: US 8,028,114 B2

(45) Date of Patent: Sep. 27, 2011

(54) INFORMATION PROCESSING APPARATUS, METHOD, AND PROGRAM FOR SIMPLIFYING AN INTERRUPT PROCESS

(75) Inventors: Hiroshi Kyusojin, Tokyo (JP); Hideki Matsumoto, Tokyo (JP); Masato Kajimoto, Chiba (JP); Chiaki Yamana, Kanagawa (JP)

(73) Assignee: Sony Corporation, Tokyo (JP)

( * ) Notice: Subject to any disclaimer, the term of this patent is extended or adjusted under 35 U.S.C. 154(b) by 298 days.

(21) Appl. No.: 11/916,183

(22) PCT Filed: May 26, 2006

(86) PCT No.: PCT/JP2006/310547

§ 371 (c)(1), (2), (4) Date: Oct. 22, 2009

(87) PCT Pub. No.: WO2006/137242

PCT Pub. Date: Dec. 28, 2006

(65) Prior Publication Data

US 2010/0095037 A1 Apr. 15, 2010

(30) Foreign Application Priority Data

Jun. 2, 2005 (JP) ................................ 2005-162587

(51) Int. Cl.
*G06F 13/24* (2006.01)

(52) U.S. Cl. ......... 710/260; 710/240; 710/200; 711/171

(58) Field of Classification Search .......... 710/260–269, 710/240–244, 200; 711/171

See application file for complete search history.

(56) References Cited

U.S. PATENT DOCUMENTS

| | | | | |
|---|---|---|---|---|
| 6,163,833 | A * | 12/2000 | Kim | 711/171 |
| 6,424,179 | B1 | 7/2002 | Stevens | |
| 6,615,302 | B1 * | 9/2003 | Birns | 710/121 |
| 2004/0225789 | A1 | 11/2004 | Kataoka | |
| 2005/0050244 | A1 | 3/2005 | Oda et al. | |
| 2005/0213665 | A1 | 9/2005 | Kyusojin | |
| 2006/0233116 | A1 | 10/2006 | Kyusojin et al. | |
| 2006/0242334 | A1 | 10/2006 | Kyusojin et al. | |

FOREIGN PATENT DOCUMENTS

| | | |
|---|---|---|
| JP | 09-223091 | 8/1997 |
| JP | 11-327938 | 11/1999 |
| JP | 2001-184298 | 7/2001 |
| JP | 2002-149419 | 5/2002 |
| JP | 2004-302680 | 10/2004 |
| JP | 2005-78596 | 3/2005 |
| JP | 2006-293800 | 10/2006 |
| JP | 2007-12021 | 1/2007 |

* cited by examiner

*Primary Examiner* — Mark Rinehart
*Assistant Examiner* — Kim T Huynh
(74) *Attorney, Agent, or Firm* — Finnegan, Henderson, Farabow, Garrett & Dunner, L.L.P.

(57) ABSTRACT

The present invention relates to an information processing apparatus, an information processing method and a program for simplifying an interrupt process to reduce time needed for the interrupt process. If it is determined in step S52 that a network card pointer and a CPU clear pointer fail to match each other, i.e., that there is a packet area corresponding to a packet used in an executed DMA transfer process and having not undergone a DMA transfer complete process, processing proceeds to step S53. An interrupt generator sets a completion status as an interrupt status and proceeds to step S54. In step S54, the interrupt generator generates an interrupt signal. If it is determined in step S52 that there is not a packet area corresponding to a packet used in an executed DMA transfer process and having not undergone a DMA transfer complete process, processing proceeds to step S55. The interrupt generator clears the completion status. The present invention is applicable to a network card, for example.

6 Claims, 17 Drawing Sheets

PERSONAL COMPUTER
1
RAM
13
DESCRIPTOR AREA
31
PACKET AREA
32
POINTER INFORMATION AREA
33
ROM
12
CPU
11
BUS
14
INPUT-OUTPUT INTERFACE
15
INPUT UNIT
16
OUTPUT UNIT
17
RECORDING UNIT
18
NETWORK CARD
19
DRIVE
20
REMOVABLE MEDIUM
21

DESCRIPTOR INFORMATION MEMORY
51
DESCRIPTOR CONTROLLER
52
PACKET COMMUNICATION UNIT
53
INTERRUPT GENERATOR
54
INTERRUPT STATUS MEMORY
55
NETWORK CARD
19

PERSONAL COMPUTER
100
RAM
13
DESCRIPTOR AREA
31
PACKET AREA
32
POINTER INFORMATION AREA
33
ROM
12
CPU
101
BUS
14
INPUT-OUTPUT INTERFACE
15
INPUT UNIT
16
OUTPUT UNIT
17
RECORDING UNIT
18
NETWORK CARD
102
DRIVE
20
REMOVABLE MEDIUM
21

PERSONAL COMPUTER
100
202
RAM
DESCRIPTOR AREA
211
PACKET AREA
32
POINTER INFORMATION AREA
33
ROM
12
CPU
201
BUS
14
INPUT-OUTPUT INTERFACE
15
INPUT UNIT
16
OUTPUT UNIT
17
RECORDING UNIT
18
NETWORK CARD
203
DRIVE
20
REMOVABLE MEDIUM
21

INFORMATION PROCESSING APPARATUS, METHOD, AND PROGRAM FOR SIMPLIFYING AN INTERRUPT PROCESS

TECHNICAL FIELD

The present invention relates to an information processing apparatus, an information processing method and a program and, in particular, to an information processing apparatus, an information processing method and a program for simplifying an interrupt process to reduce time required for the interrupt process.

BACKGROUND ART

FIG. 1 is a block diagram illustrating a personal computer including a network card that performs a DMA transfer using a descriptor 70 (FIG. 3).

DISCLOSURE OF INVENTION

As shown in FIG. 1, a CPU (Central Processing Unit) 11 connects to a ROM (Read Only Memory) 12 and a RAM (Random Access Memory) 13 via a bus 14. The CPU 11 performs a variety of processes in accordance with a program recorded on the ROM 12 or a program recorded on a recording unit 18.

For example, the CPU 11 causes a descriptor area 31 (to be discussed later) in the RAM 13 to store an address or like of a packet stored on a packet area 32 in the descriptor area 31 as a descriptor 70 to be DMA transferred. The descriptor 70 is information that the network card 19 uses to perform a DMA transfer process.

The CPU 11 then causes a pointer information area 33 in the RAM 13 to store a CPU set pointer representing an address of a descriptor area 31 that is going to store a next descriptor 70. In response to an interrupt signal supplied from the network card 19, the CPU 11 performs an interrupt process responsive to an interrupt status representing a cause of the interrupt signal and stored on the network card 19. For example, the CPU 11 performs a DMA transfer completion process such as a clear operation to (the packet area 32) of the RAM 13 used in the descriptor 70 corresponding to a DMA transfer process previously performed by the network card 19. The CPU 11 causes the pointer information area 33 in the RAM 13 to store a CPU clear pointer representing an address of a next descriptor 70 (corresponding to a packet area 32 for a next DMA transfer completion process) subsequent to the descriptor 70 corresponding to the packet area 32 having undergone the DMA transfer completion process. The CPU 11 then clears (releases) the interrupt status stored on the network card 19.

The RAM 13 includes the descriptor area 31 storing the descriptor 70, the packet area 32 storing the packet to be DMA transferred and the pointer information area 33 storing, as pointer information, a CPU set pointer and a CPU clear pointer.

The CPU 11 also connects to an input-output interface 15 via the bus 14. The input-output interface 15 is connected to an input unit 16 composed of a keyboard and a mouse, and an output unit 17 composed of one of an LCD (Liquid Crystal Display) and a CRT (Cathode Ray Tube) display. The CPU 11 performs a variety of processes in response to an instruction input from the input unit 16. The CPU 11 outputs an image and audio obtained as a result of each process to the output unit 17.

The recording unit 18 connected to the input-output interface 15 includes a hard disk or the like, and records a program to be executed by the CPU 11 and a variety of data. The network card 19 performs a DMA process. More specifically, the network card 19 reads the packet stored on the packet area 32 in the RAM 13 in response to the descriptor 70 stored on the descriptor area 31 in the RAM 13 and transmits the read packet to another apparatus via a network (not shown). The network card 19 receives a packet via the network (not shown) and causes the RAM 13 to store the received packet.

The following discussion focuses on only the case in which the network card 19 performs the DMA transfer process and transmits the packet obtained as a result. The reception of the packet is also performed in a similar fashion.

When loaded with one of a magnetic disk, an optical disk, a magneto-optical disk and a semiconductor memory, a drive 20 connected to the input-output interface 15 drives the loaded recording medium and acquires a program and data recorded on the recording medium. The acquired program and data are transferred to the recording unit 18 as necessary for recording.

FIG. 2 is a functional block diagram illustrating the network card 19 of FIG. 1.

The network card 19 of FIG. 2 includes a descriptor information memory 51, a descriptor controller 52, a packet communication unit 53, an interrupt generator 54 and an interrupt status memory 55.

The descriptor information memory 51 pre-stores (pre-records) a header address (hereinafter referred to as a descriptor header address) of the descriptor area 31 in the RAM 13 and the number of descriptors recordable on the descriptor area 31. The descriptor controller 52 can access the descriptor area 31 in the RAM 13 based on the descriptor header address and the number of descriptors.

The CPU 11 of FIG. 1 supplies to the descriptor information memory 51 the CPU set pointer and the CPU clear pointer stored as pointer information on the pointer information area 33 for storage.

The descriptor information memory 51 stores a network card pointer representing an address of a descriptor 70 (corresponding to a DMA transfer process to be performed next) subsequent to the descriptor 70 corresponding to the previously performed DMA transfer process and supplied from the descriptor controller 52. If no process is performed yet, the descriptor controller 52 reads a descriptor header address from the descriptor information memory 51, and supplies the descriptor header address as a network card pointer to the descriptor information memory 51 for storage. In response to a request from the CPU 11, the descriptor information memory 51 supplies the network card pointer to the CPU 11.

The descriptor controller 52 reads from the descriptor information memory 51 the network card pointer and the CPU set pointer, and determines the descriptor 70 corresponding to the DMA transfer process to be performed next in accordance with the network card pointer and the CPU set pointer.

The descriptor controller 52 reads the descriptor 70 from the descriptor area 31, reads from the packet area 32 the packet to be DMA transferred in accordance with the descriptor 70, and supplies the packet to the packet communication unit 53. The DMA transfer process is thus performed.

The descriptor controller 52 updates the network card pointer to be stored on the descriptor information memory 51 in accordance with completion information representing the completion of the DMA transfer process and supplied from the packet communication unit 53. The descriptor controller 52 also notifies the interrupt generator 54 of the completion of the DMA transfer process.

The packet communication unit 53 transmits the packet from the descriptor controller 52 to another device via a network (not shown). The packet communication unit 53 supplies the completion information to the descriptor controller 52 in accordance with the packet from the descriptor controller 52.

In response to the notification of the completion of the DMA transfer process from the descriptor controller 52, the interrupt generator 54 generates an interrupt signal and supplies the interrupt signal to the CPU 11. In response to the notification, the interrupt generator 54 updates the interrupt status stored on the interrupt status memory 55 with an interrupt status that indicates that the cause of the interrupt signal is the completion of the DMA transfer process corresponding to the descriptor 70 (the status hereinafter is referred to as completion status).

The interrupt status memory 55 stores the interrupt status. The interrupt status memory 55 under the control of the interrupt generator 54 sets (updates) the interrupt status to the completion status. The interrupt status memory 55 also clears the completion status in response to a request from the CPU 11.

FIG. 3 illustrates an example of the descriptor 70 stored on the descriptor area 31 of FIG. 1.

As shown in FIG. 3, the descriptor 70 includes an upper address area 71, a lower address area 72, a reserved area 73 and a packet size area 74.

The upper address area 71 and the lower address area 72 respectively store upper 32 bits and lower 32 bits of an address of the packet to be DMA transferred. The reserved area 73 is an empty area. The packet size area 74 stores a data size of the packet to be DMA transferred.

As a process responsive to the descriptor 70, the descriptor controller 52 reads the packet at the address of 64 bits stored on the upper address area 71 and the lower address area 72 on the packet area 32, and then supplies the packet to the packet communication unit 53.

The descriptor header address, the number of descriptors, the CPU clear pointer, the network card pointer and the CPU set pointer stored on the descriptor information memory 51 are described with reference to FIG. 4.

The descriptors 70 are numbered with the first one starting with 0. Hereinafter a descriptor 70 having number i is referred to as a descriptor #1.

The descriptor area 31 of FIG. 4 is composed descriptor areas 91-0 through **91-*n*, respectively storing (n+1) descriptors, namely, descriptor #0 through descriptor #n consecutively arranged on the RAM 13. The number of descriptors storable on the descriptor area 31 in the descriptor information memory 51 of FIG. 2 is (n+1). The descriptor information memory 51** also stores the address of the descriptor #0 as the descriptor header address.

As shown in FIG. 4, the CPU 11 generates descriptor #0 through descriptor #4, and stores the generated descriptor #0 through descriptor #4 respectively on descriptor areas 91-0 through 91-4. The CPU 11 causes the descriptor information memory 51 to store as a CPU set pointer the address of the descriptor area 91-5 going to store the descriptor #5 next.

The descriptor controller 52 reads from the packet area 32 the packet in a process responsive to descriptors #0 through #3 in accordance with descriptors #0 through #3 and supplies the read packet to the packet communication unit 53. The descriptor controller 52 thus performs the DMA transfer process.

The descriptor controller 52 responds to the completion information which represents the completion of the DMA transfer process responsive to the descriptors #0 through #3 and which have been supplied by the packet communication unit 53 at the completion of the DMA transfer process. More specifically, in response to the completion information, the descriptor controller 52 causes the descriptor information memory 51 to store the address of the descriptor #4 corresponding to a DMA transfer process to be performed next as a network card pointer.

The descriptor #4 stored on a descriptor area 91-4 between the CPU set pointer and the network card pointer is stored on the CPU 11. That descriptor #4 is a descriptor 70 corresponding to a DMA transfer process not yet completed by the descriptor controller 52.

In response to the interrupt signal from the interrupt generator 54, the CPU 11 performs the DMA transfer completion process such as a clear operation on (the packet area 32) in the RAM 13. The packet area 32 in the RAM 13 in this case is specified by the upper address area 71, the lower address area 72 and the packet size area 74 of the descriptor #0 as the descriptor 70 that corresponds to the DMA transfer process executed by the descriptor controller 52. The CPU 11 causes the descriptor information memory 51 to store, as a CPU clear pointer, the address of the descriptor #1 corresponding to the packet area 32 that is going to be handled in a next DMA transfer completion process.

The interrupt process of the personal computer 1 will be described below with reference to FIG. 5.

In step S11, the interrupt generator 54 in the network card 19 generates the interrupt signal in response to the notification of the completion of the DMA transfer process from the descriptor controller 52 and transmits the interrupt signal to the CPU 11 (notifies the CPU 11 of the interrupt signal). Processing proceeds to step S12.

In step S1, the CPU 11 receives the interrupt signal from the interrupt generator 54. Processing proceeds to step S2. In step S2, the CPU 11 requests the network card 19 to read the interrupt status, and proceeds to step S3.

In step S12, the interrupt status memory 55 in the network card 19 receives from the CPU 11 the request to read the interrupt status. Processing proceeds to step S13. In step S13, in response to the request to read the interrupt status, the interrupt status memory 55 notifies of (transmits) the completion status currently stored as the interrupt status. Processing proceeds to step S14.

In step S3, the CPU 11 receives the completion status from the interrupt status memory 55. Processing proceeds to step S4. In step S4, the CPU 11 requests the network card 19 to reads the network card pointer, and proceeds to step S5.

In step S14, the descriptor information memory 51 in the network card 19 receives from the CPU 11 the request to read the network card pointer. Processing proceeds to step S15. In step S15, the descriptor information memory 51 responds to the request to read the network card pointer, thereby notifying of the stored network card pointer. Processing proceeds to step S16.

In step S5, the CPU 11 receives the network card pointer from the descriptor information memory 51, and proceeds to step S6. In step S6, the CPU 11 reads the CPU clear pointer of pointer information stored on the pointer information area 33 in the RAM 13 (FIG. 1). In response to that CPU clear pointer and the network card pointer from the descriptor information memory 51, the CPU 11 performs the DMA transfer completion process such as a clear operation on the packet area 32 on one of the descriptor areas 91-1 through **91-*n* in the RAM 13**.

The descriptor area 31 in the RAM 13 might be the descriptor area 31 of FIG. 4. Based on the address of the descriptor #4 as the network card pointer and the address of the descriptor #1 as the CPU clear pointer, the CPU 11 recognizes that the descriptors 70 corresponding to the DMA transfer process previously performed by the descriptor controller 52 are the descriptors #0 through #3 and the DMA transfer completion process has been performed on only the packet area 32 corresponding to the descriptor #0 among the packet areas 32 corresponding to the descriptors #0 through #3.

The CPU 11 performs the DMA transfer completion process such as a clear operation on the packet area 32 in the RAM 13. The packet area 32 in the RAM 13 herein corresponds to a packet used in the DMA transfer process previously performed by the descriptor controller 52 and having not undergone the DMA transfer completion process and specified by the upper address area 71, the lower address area 72 and the packet size area 74 of the descriptors #1 through #3.

If the interrupt status is the completion status as described above, the CPU 11 performs the DMA transfer completion process such as the clear operation on the packet area 32 in the RAM 13 in the descriptor 70 corresponding to the DMA transfer process previously executed by the descriptor controller 52. The completion status is understood as an interrupt status to cause the packet area 32 corresponding to the previously executed DMA transfer process to perform the DMA transfer completion process.

Processing proceeds from step S6 to step S7. In accordance with the descriptors 91-0 through 91-*n* corresponding to the packet area 32 as a target of the DMA transfer completion process in step S6, the CPU 11 transmits to the network card 19 the addresses of the descriptors 91-0 through 91-*n* corresponding to the packet area 32 as a next target of the DMA transfer completion process as the CPU clear pointer. The CPU 11 thus requests the network card 19 to update the CPU clear pointer.

In step S16, the descriptor information memory 51 in the network card 19 receives the CPU clear pointer from the CPU 11 and updates the stored CPU clear pointer with the received CPU clear pointer. The CPU clear pointer is thus updated. Processing proceeds to step S17.

Processing proceeds from step S7 to step S8. The CPU 11 requests the interrupt status memory 55 to clear the completion status stored as the interrupt status and then ends the process.

In step S17, the interrupt status memory 55 in the network card 19 receives from the CPU 11 the request to clear the completion status. In response to the request to clear the completion status, the interrupt status memory 55 in the network card 19 clears the completion status. More specifically, the interrupt status memory 55 clears the interrupt status stored thereon.

A variety of methods intended to perform the interrupt process accurately and efficiently have been proposed in connection with devices performing the interrupt process. For example, an asynchronous interrupt notification circuit composed of a differentiating circuit, an integrating circuit and a register may be used to handle accurately an interrupt signal between an I/O device operating under an asynchronous clock and a CPU (for example, refer to Patent Document 1).

A logic unit including a flipflop for clearing efficiently an interrupt to a peripheral device operating under a frequency lower than a processor performing an interrupt process is available (for example, refer to Patent Document 2).

[Patent Document 1] Japanese Unexamined Patent Application Publication No. 2001-184298

[Patent Document 2] Japanese Unexamined Patent Application Publication No. 2002-149419

DISCLOSURE OF INVENTION

Problems to Be Solved by the Invention

Generally, accesses performed to a register such as the descriptor information memory 51 or the interrupt status memory 55 in the network card 19 via the bus 14 and the input-output interface 15 take more time than accesses performed to the RAM 13 via the bus 14.

As shown in FIG. 5, the CPU 11 needs a substantial amount of time to perform the interrupt status, i.e., to read in the interrupt process the network card pointer and the CPU clear pointer stored on the descriptor information memory 51 and the interrupt status stored on the interrupt status memory 55.

Time required for the interrupt process is preferably reduced and the workload on the CPU 11 is preferably reduced by reducing accesses of the CPU 11 to the network card 19 in the interrupt process and simplifying the interrupt process.

In view of the above problems, the present invention is intended to simplify the interrupt process and reduce the time required for the interrupt process.

Means for Solving the Problems

A first information processing apparatus of the present invention includes data storage means for storing predetermined data, executing means for executing a data process on the data in accordance with processing information for executing the data process on the data, generating means for generating an interrupt signal, clearing means for clearing the data storage means in accordance with the interrupt signal generated by the generating means. The generating means includes determining means for determining whether the data storage means corresponding to the data used in the data process executed by the executing means and not yet cleared by the clearing means is present, and interrupt control means for generating the interrupt signal and setting a predetermined status to the interrupt signal if the determining means determines that the data storage means corresponding to the data used in the data process executed by the executing means and not yet cleared by the clearing means is present, and clearing the predetermined status if the determining means determines that the data storage means corresponding to the data used in the data process executed by the executing means and not yet cleared by the clearing means is not present.

A second information processing apparatus includes executing means for executing a data process on the data in accordance with processing information for executing the data process on the data, determining means for determining whether data storage means corresponding to the data used in the data process executed by the executing means and not yet cleared is present, and interrupt control means for generating an interrupt signal and setting a predetermined status to the interrupt signal if the determining means determines that the data storage means corresponding to the data used in the data process executed by the executing means and not yet cleared is present, and clearing the predetermined status if the determining means determines that the data storage means corresponding to the data used in the data process executed by the executing means and not yet cleared is not present.

The information processing apparatus further includes execution/clear process information storage means for storing, as process information, execution process information corresponding to the data process executed by the executing means and clear process information corresponding to the already cleared data storage means. The determining means performs the determination operation thereof, based on the execution process information and the clear process information stored on the execution/clear process information storage means.

The process information contains execution information indicating whether the data process corresponding to the process information has been executed. The executing means updates the execution information contained in the process information if the executing means has executed the data process corresponding to the process information, and the determining means determines the determination operation thereof based on the execution information.

An information processing method of the present invention includes an executing step of executing a data process on the data in accordance with processing information for executing the data process on the data, a determining step of determining whether the data storage means corresponding to the data used in the data process executed in the executing step and not yet cleared is present, and an interrupt control step of generating an interrupt signal and setting a predetermined status to the interrupt signal if the determining step indicates that the data storage means corresponding to the data used in the data process executed in the executing step and not yet cleared is present, and clearing the predetermined status if the determining step indicates that the data storage means corresponding to the data used in the data process executed in the executing step and not yet cleared is not present.

A program of the present invention includes an executing step of executing a data process on the data in accordance with processing information for executing the data process on the data, a determining step of determining whether the data storage means corresponding to the data used in the data process executed in the executing step and not yet cleared is present, and an interrupt control step of generating the interrupt signal and setting a predetermined status to the interrupt signal if the determining step indicates that the data storage means corresponding to the data used in the data process executed in the executing step and not yet cleared is present, and clearing the predetermined status if the determining step indicates that the data storage means corresponding to the data used in the data process executed in the executing step and not yet cleared is not present.

The first information processing apparatus of the present invention executes the data process on the data in accordance with the processing information for executing the data process on the data, and determines whether the data storage means corresponding to the data used in the executed data process and not yet cleared is present. The first information processing apparatus generates the interrupt signal and sets the predetermined status to the interrupt signal if the determining means determines that the data storage means corresponding to the data used in the executed data process and not yet cleared is present, and clears the predetermined status if the determining means determines that the data storage means corresponding to the data used in the executed data process and not yet cleared is not present. The data storage means is released in response to the interrupt signal.

In accordance with the second information processing apparatus, the information processing method and the program of the present invention, the data process is performed on the data in accordance with the processing information for executing the data process on the data, and the determining means determines whether the data storage means corresponding to the data used in the executed data process and not yet cleared is present. The interrupt signal is generated and a predetermined status is set to the interrupt signal if the determining means determines that the data storage means corresponding to the data used in the executed data process and not yet cleared is present. The predetermined status is cleared if the determining means determines that data storage means corresponding to the data used in the executed data process and not yet cleared is not present.

Advantages

The present invention simplifies the interrupt process and reduces time required for the interrupt process.

REFERENCE NUMERALS

13 RAM, 31 descriptor area, 32 packet area, 33 pointer information area, 51 descriptor information memory, 53 packet communication unit, 100 personal computer, 101 CPU, 102 network card, 121 descriptor controller, 122 interrupt generator, 123 interrupt status memory, 201 CPU, 202 RAM, 211 descriptor area, 203 network card, 221 descriptor controller, 240 descriptor, 241 completed bit area

BEST MODE FOR CARRYING OUT THE INVENTION

The embodiments of the present invention are specifically described with reference to the drawings.

Figure 1:
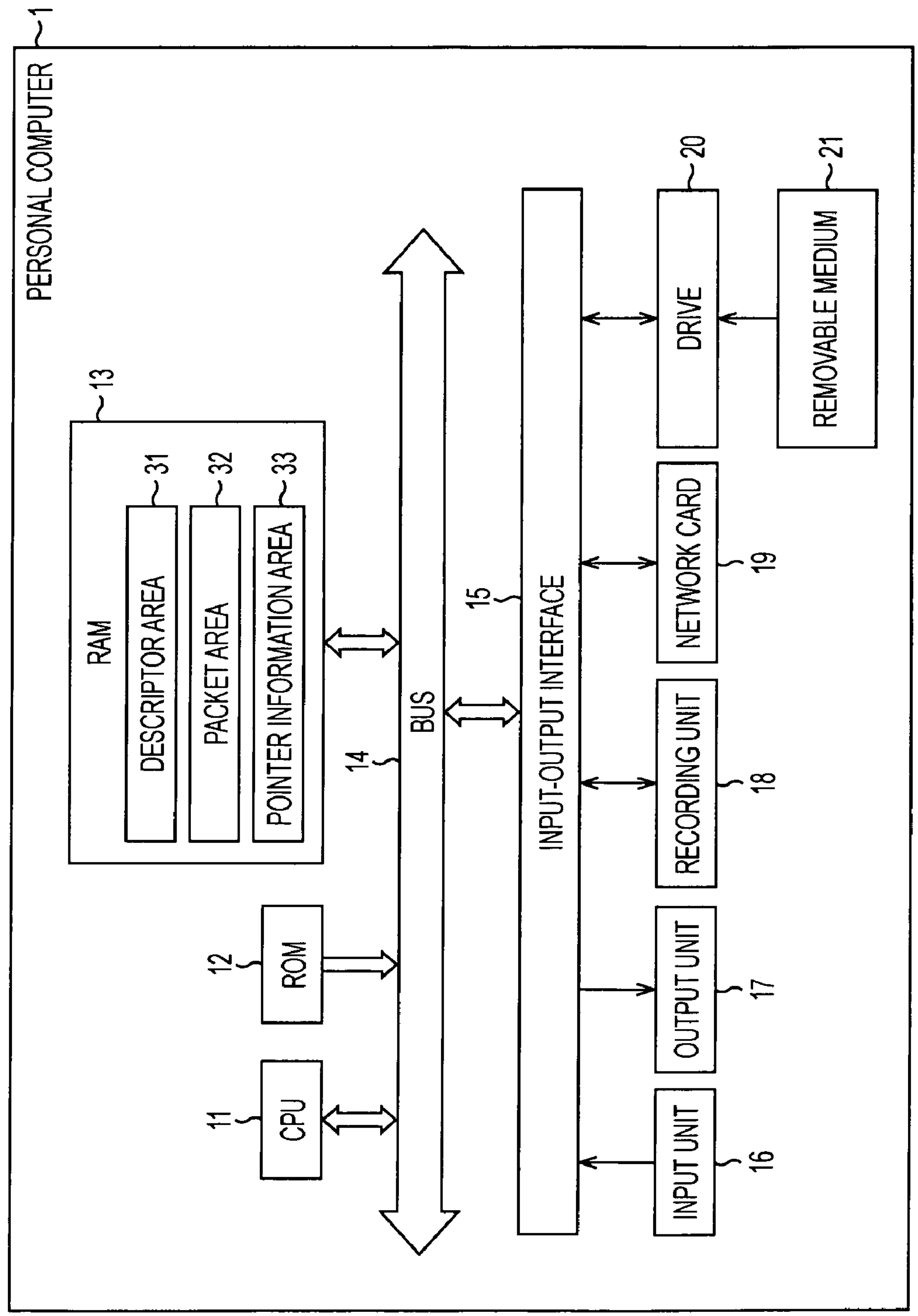
FIG. 1 is a block diagram illustrating one example of known personal computer.
Figure 6:
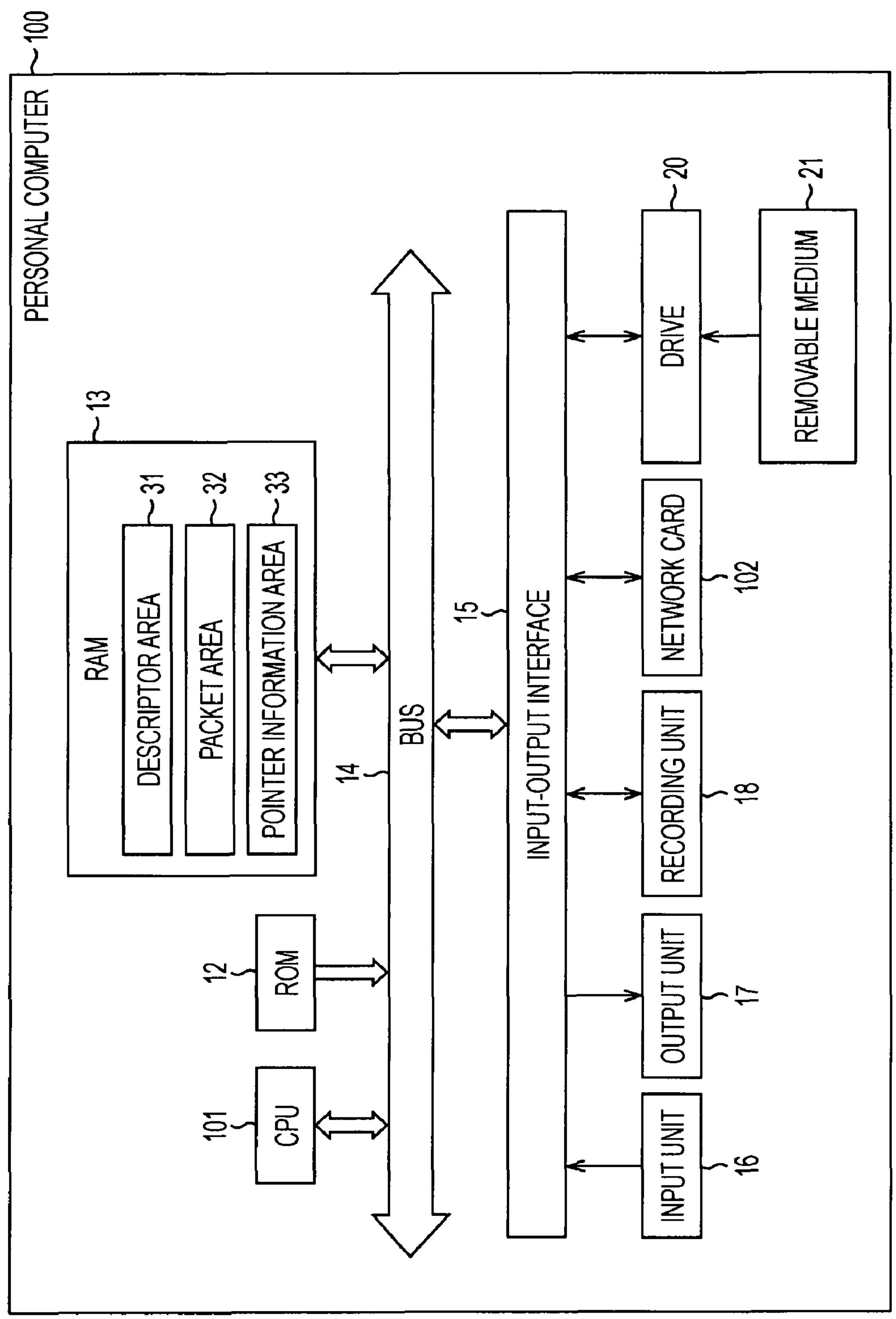
FIG. 6 is a block diagram illustrating a hardware structure of a personal computer in accordance with one embodiment of the present invention.

FIG. 6 is a block diagram illustrating a hardware structure of a personal computer 100 in accordance with one embodiment of the present invention. In FIG. 6, elements identical to those illustrated in FIG. 1 are designated with the same reference numerals, and the discussion thereof is omitted here.

The personal computer 100 of FIG. 6 includes a ROM 12, a RAM 13, a bus 14, an input-output interface 15, an input unit 16, an output unit 17, a recording unit 18, a drive 20, a CPU 101 and a network card 102. In accordance with the descriptor 70, the personal computer 100 DMA transfers a packet stored on the RAM 13 to the network card 102.

The CPU 101 of FIG. 6 causes the descriptor area 31 in the RAM 13 to store as the descriptor 70 the address of the packet stored on the packet area 32 in the RAM 13 as a target of the DMA transfer, thereby causing the network card 102 to DMA transfer the packet.

The CPU 101 causes the pointer information area 33 in the RAM 13 to store the CPU set pointer representing the address of the descriptor area 31 that is going to store the descriptor 70 next. The CPU 101 performs the DMA transfer completion process such as a clear operation to the packet area 32 in the RAM 13. The packet area 32 in the RAM 13 is used in the descriptor 70 corresponding to the DMA transfer process performed by the network card 102 as an interrupt process to the completion status stored on the network card 102. The CPU 101 causes the pointer information area 33 in the RAM 13 to store the CPU clear pointer representing the address of the descriptor 70 corresponding to the packet area 32 as a next target of the DMA transfer completion process.

The network card 102 performs the DMA transfer process. More specifically, the network card 102 reads the packet to be stored on the packet area 32 in the RAM 13 based on the descriptor 70 stored on the descriptor area 31 in the RAM 13, and transmits the read packet to another device via a network (not shown). The network card 102 clears the completion status in response to the network card pointer and the CPU clear pointer.

Figure 2:
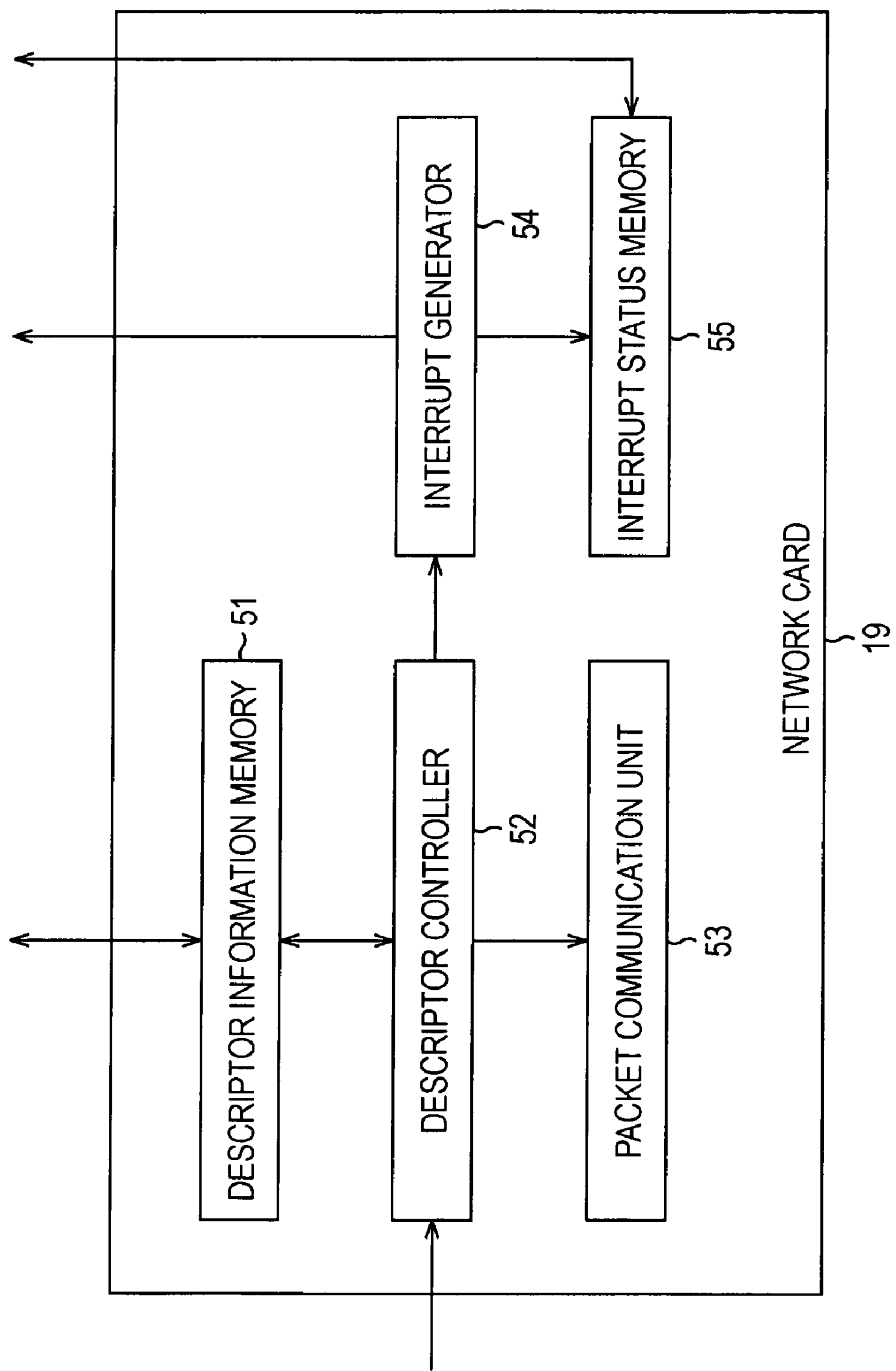
FIG. 2 is a functional block diagram illustrating a network card of FIG. 1.
Figure 7:
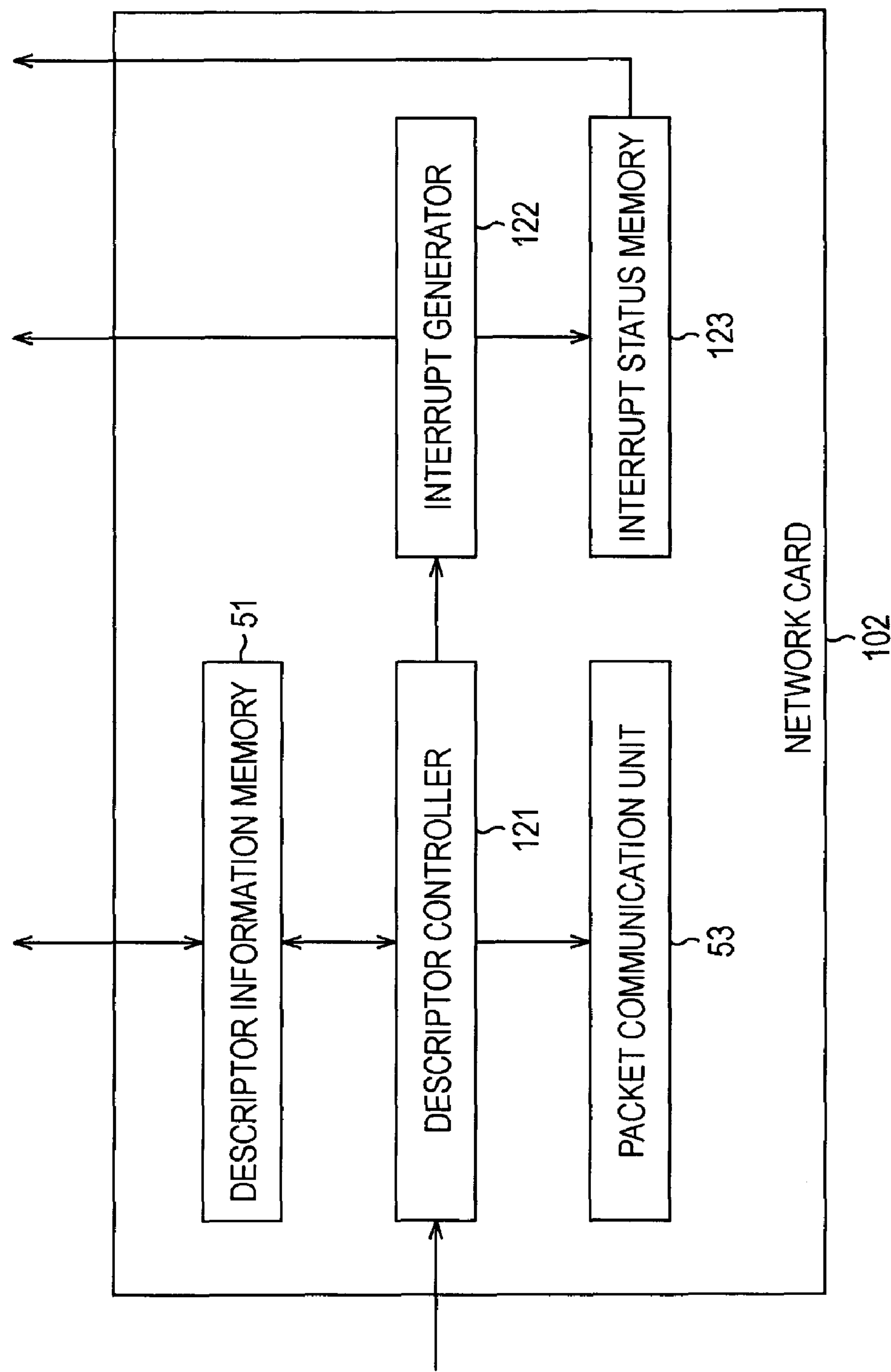
FIG. 7 is a block diagram illustrating in detail a network card of FIG. 6.

FIG. 7 is a function block diagram illustrating the network card 102 of the FIG. 6 that performs a predetermined program. In FIG. 7, elements identical to those illustrated in FIG. 2 are designated with the same reference numerals.

A descriptor controller 121 of FIG. 7 reads the network card pointer and the CPU set pointer from the descriptor information memory 51 and determines the descriptor 70 corresponding to the DMA transfer process to be performed, based on the network card pointer and the CPU set pointer. The descriptor controller 121 reads the packet to be DMA transferred, from the packet area 32 in accordance with the descriptor 70, and supplies the packet to the packet communication unit 53. The DMA transfer process is thus performed.

In accordance with the completion information representing the completion of the DMA transfer process supplied from the packet communication unit 53, the descriptor controller 121 updates the network card pointer stored on the descriptor information memory 51. The descriptor controller 121 also notifies the interrupt generator 54 of the completion of the DMA transfer process.

The descriptor controller 121 reads the network card pointer and the CPU clear pointer from the descriptor information memory 51 and instructs the interrupt generator 122 to set or clear the completion status based on the network card pointer and the CPU clear pointer.

In response to the notification of the completion of the DMA transfer process from the descriptor controller 121, the interrupt generator 122 generates the interrupt signal and supplies the generated interrupt signal to the CPU 101. In response to the set instruction or clear instruction of the completion status from the descriptor controller 121, the interrupt generator 122 updates the interrupt status stored on the interrupt status memory 123 to the completion status or clears the completion status stored on the interrupt status memory 123.

The interrupt status memory 123 stores the interrupt status. The interrupt status memory 123 under the control of the interrupt generator 122 sets the interrupt status to the completion status or clears the completion status.

Figure 8:
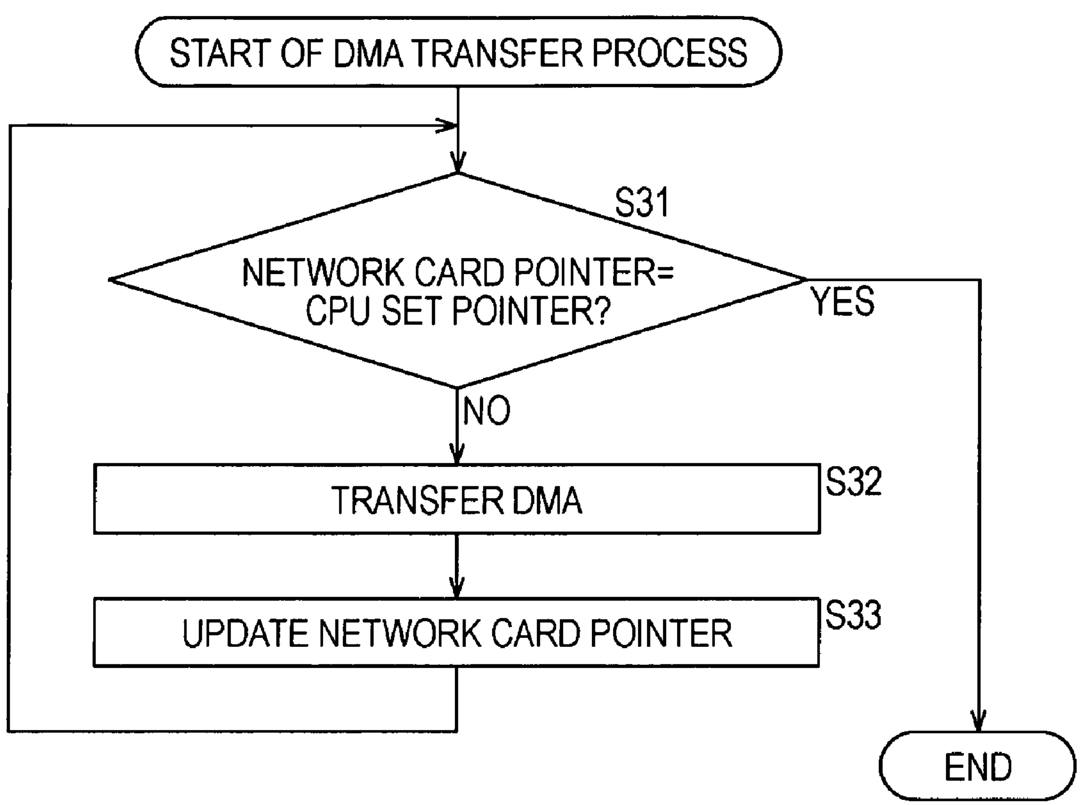
FIG. 8 is a flowchart illustrating a DMA transfer process performed by the network card.

With reference to FIG. 8, the DMA transfer process of the network card 102 is described below. The DMA transfer process is initiated when the CPU set pointer supplied from the CPU 101 is stored onto the descriptor information memory 51.

In step S31, the descriptor controller 121 reads the network card pointer and the CPU set pointer from the descriptor information memory 51 and determines whether the network card pointer and the CPU set pointer match each other.

If it is determined in step S31 that the network card pointer and the CPU set pointer do not match each other, i.e., that the descriptor 70 corresponding to an unexecuted DMA transfer process is present, the descriptor controller 121 performs the DMA transfer.

More specifically, the descriptor controller 121 reads from the descriptor area 31 in the RAM 13 the descriptor 70 stored at the address represented by the network card pointer. The descriptor controller 121 reads the packet stored on the packet area 32 in the RAM 13 based on the address stored on the upper address area 71 and the lower address area 72 of the descriptor 70. The descriptor controller 121 then supplies the read packet to the packet communication unit 53.

If the network card pointer represents the address of the descriptor #4 and the CPU set pointer represents the address of the descriptor #5, the descriptor controller 121 reads the descriptor #4 and supplies the read descriptor #4 to the packet communication unit 53 to perform the DMA transfer process.

Processing proceeds from step S32 to step S33. The descriptor controller 121 updates the network card pointer stored on the descriptor information memory 51 to an address subsequent to the descriptor 70 corresponding to the DMA transfer process performed in step S32, namely, to an address of a descriptor 70 subsequent to the descriptor 70 stored at the address represented by the current network card pointer. Processing returns to step S31.

If it is determined in step S31 that the network card pointer and the CPU set pointer match each other, i.e., if it is determined in step S31 that the DMA transfer processes corresponding to all descriptors 70 stored on the descriptor area 31 are executed, processing ends.

Figure 9:
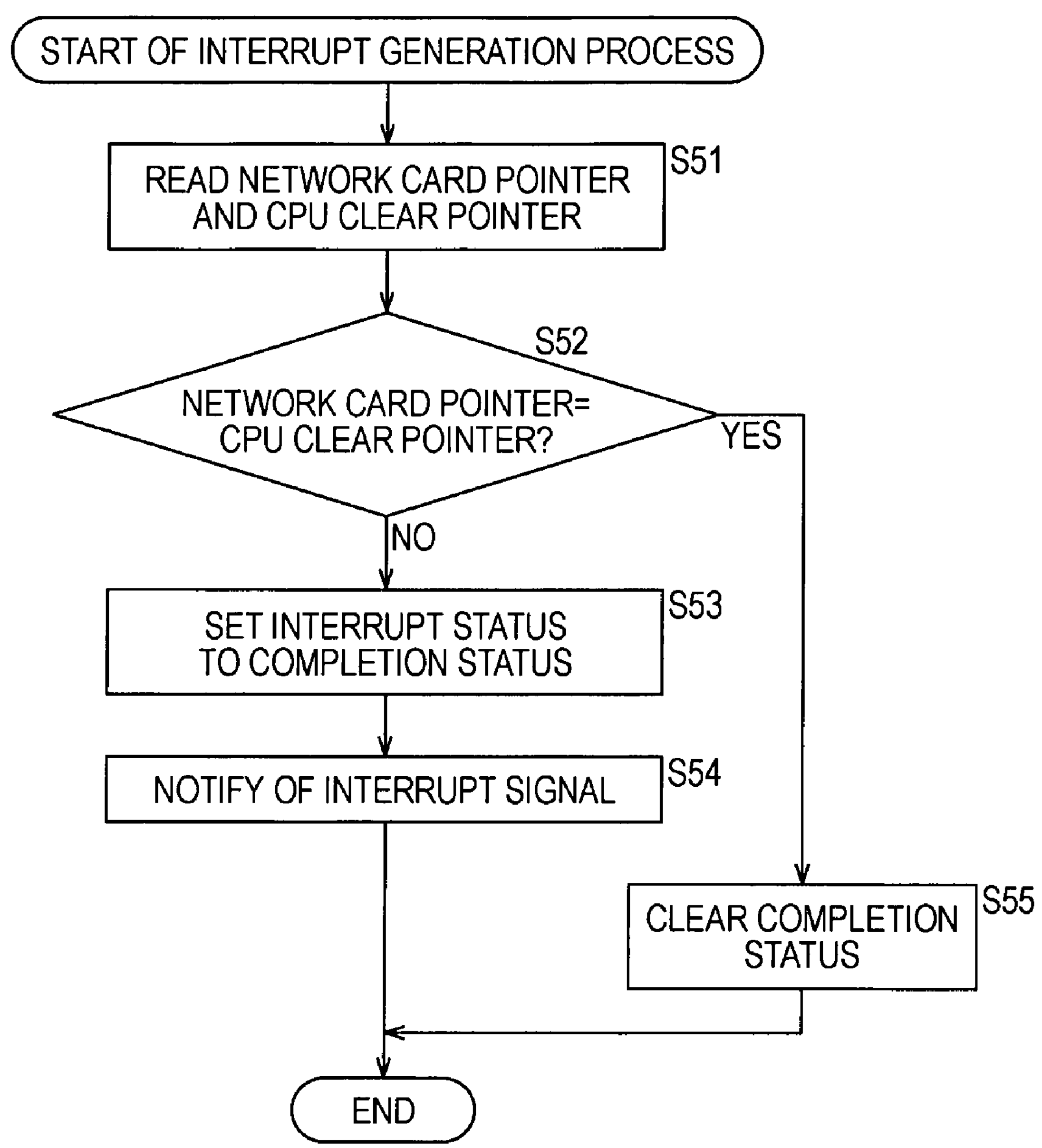
FIG. 9 is a flowchart illustrating an interrupt generation process of the network card.

With reference to FIG. 9, an interrupt generation process of the network card 102 is described below. The interrupt generation process is initiated when one of the network card pointer and the CPU clear pointer stored on the descriptor information memory 51 is updated in response to a request from the CPU 101.

In step S51, the descriptor controller 121 reads the network card pointer and the CPU clear pointer from the descriptor information memory 51. Processing proceeds to step S52.

In step S52, the descriptor controller 121 determines whether the read network card pointer and the read CPU clear pointer match each other. If it is determined in step S52 that the read network card pointer and the read CPU clear pointer do not match each other, i.e., that the packet area 32 that corresponds the packet used in the DMA transfer process executed by the descriptor controller 121 and that has not undergone the DMA transfer completion process of the CPU 101 is present, the descriptor controller 121 instructs the interrupt generator 122 to set the completion status. Processing proceeds to step S53.

In step S53, the interrupt generator 122 sets (updates) the interrupt status stored on the interrupt status memory 123 to the completion status in response to the instruction to set the completion status received from the descriptor controller 121. Processing proceeds to step S54.

In step S54, the interrupt generator 122 generates an interrupt signal with the interrupt status being the completion status and notifies of the interrupt signal. More specifically, the interrupt generator 122 notifies the packet area 32 used in the descriptor 70 corresponding to the DMA transfer process executed by the descriptor controller 121 of the interrupt signal in order to perform the DMA transfer completion process such as the clear operation.

If it is determined in step S52 that the network card pointer and the CPU clear pointer match each other, the descriptor controller 121 instructs the interrupt generator 122 to clear the completion status. Processing proceeds to step S55.

In step S55, the interrupt generator 122 clears the completion status in response to the instruction to clear the completion status from the descriptor controller 121. The process thus ends.

Figure 10:
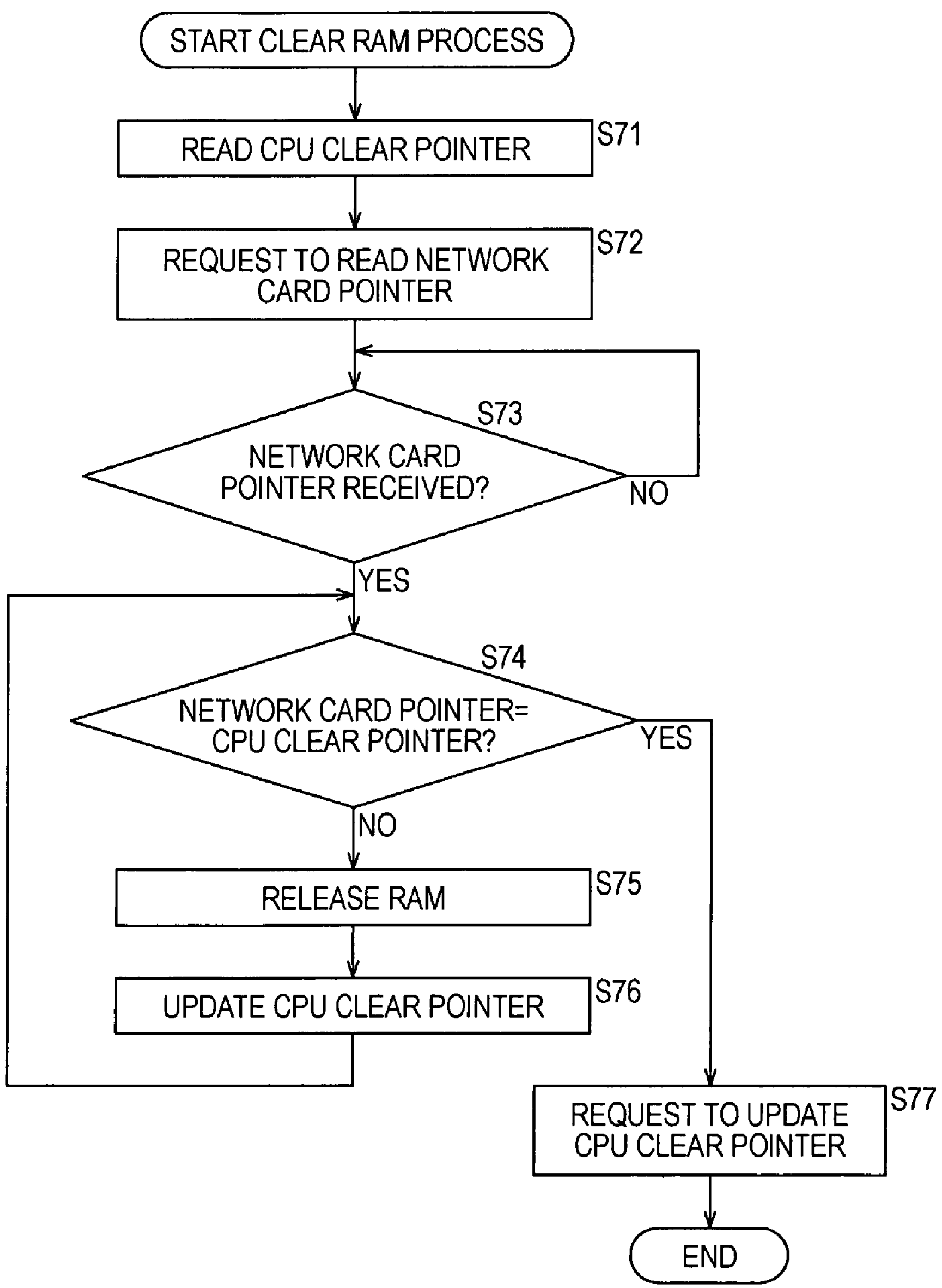
FIG. 10 is a flowchart illustrating a release RAM process performed by a CPU.

With reference to FIG. 10, the clear RAM process of the CPU 101 is described below. The clear RAM process is initiated when the interrupt signal is supplied from the network card 102 with the interrupt status being the completion status.

In step S71, the CPU 101 reads the CPU clear pointer from the pointer information area 33 in the RAM 13 and proceeds to step S72.

In step S72, the CPU 101 requests the network card 102 to read the network card pointer and proceeds to step S73.

In step S73, the CPU 101 determines whether the network card pointer has been received from the descriptor information memory 51 in response to the request to read the network card pointer. If it is determined in step S73 that no network card pointer has been received, the CPU 101 waits on standby until the network card pointer is received.

If it is determined in step S73 that the network card pointer has been received, processing proceeds to step S74. The CPU 101 determines whether that network card pointer matches the CPU clear pointer read in step S71.

If it is determined in step S74 that the network card pointer and the CPU clear pointer fail to match each other, processing proceeds to step S75. The CPU 101 performs the DMA transfer completion process such as the clear operation on the packet area 32 in the RAM 13 used in the descriptor 70 stored at the address represented by the CPU clear pointer and proceeds to step S76.

In step S76, the CPU 101 updates the CPU clear pointer stored on the pointer information area 33 in the RAM 13 to an address subsequent to the descriptor 70 corresponding to the packet area 32 having undergone the DMA transfer completion process in step S75, namely, to a CPU clear pointer representing an address subsequent to the address represented by the current CPU clear pointer. Processing returns to step S74.

If it is determined in step S74 that the network card pointer and the CPU clear pointer match each other, processing proceeds to step S77. The CPU 102 causes the descriptor information memory 51 to update the CPU clear pointer, by supplying the CPU clear pointer to the descriptor information memory 51. The process thus end.

The interrupt process of the personal computer 100 is described below with reference to FIG. 11.

In step S101, the network card 102 performs steps S51 through S54 of FIG. 9, thereby notifying the CPU 101 of the interrupt signal. Processing proceeds to step S102.

Figure 5:
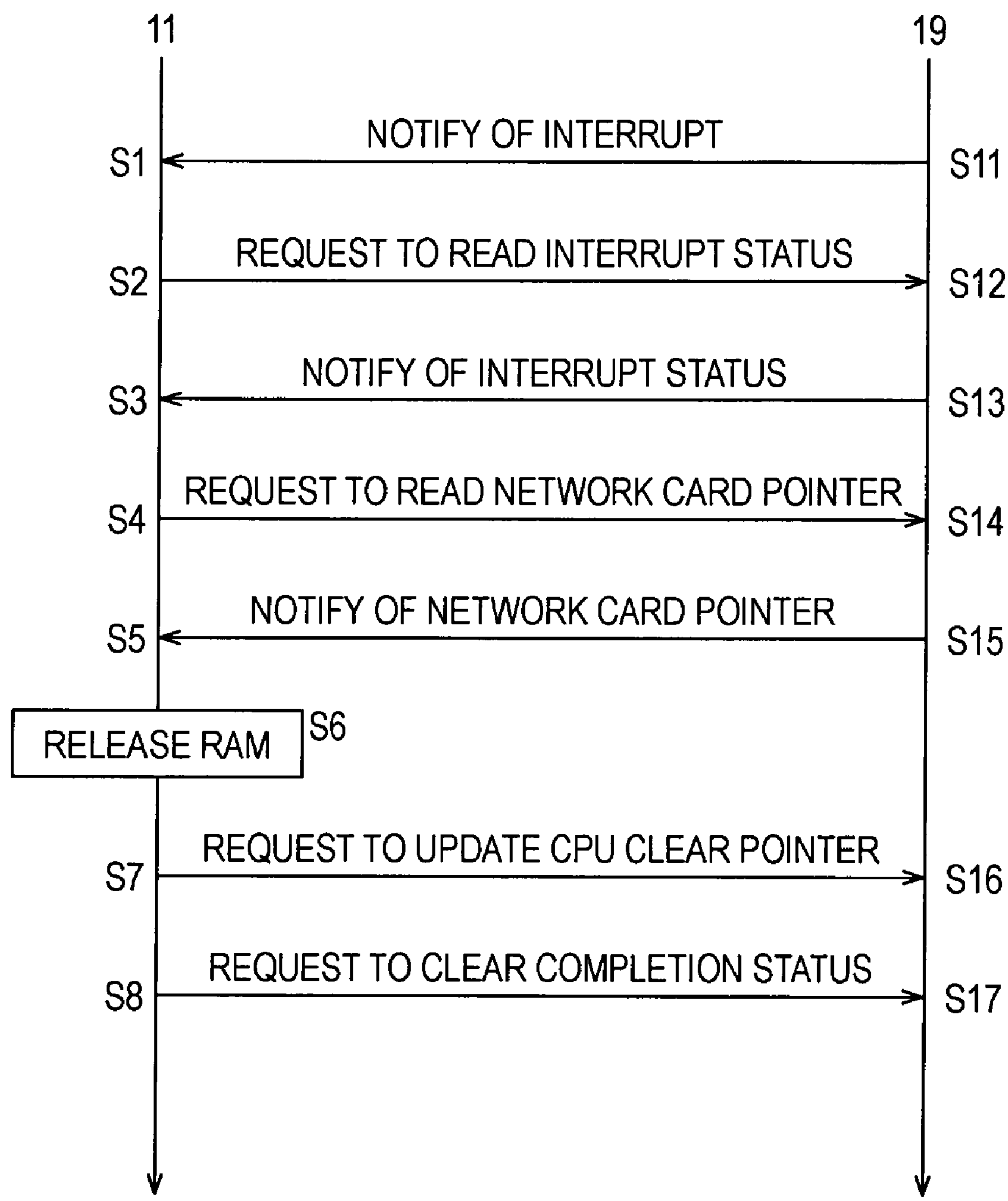
FIG. 5 is a flowchart illustrating an interrupt process of the personal computer 1.

Steps S91 through S95 are identical to steps S51 through S54 of FIG. 5, respectively, and the discussion thereof is omitted herein. Steps S102 through S105 are identical to steps S12 through S15 of FIG. 5, and the discussion thereof is omitted.

Processing proceeds from step S95 to step S96. The CPU 101 performs steps S71 through S76 of FIG. 10, thereby clearing the packet area 32 in the RAM 13. Processing proceeds to step S97.

In step S97, the CPU 101 performs step S77 of FIG. 10, thereby issuing a request to update the CPU clear pointer. The process thus ends.

Processing proceeds from step S105 to step S106. The descriptor information memory 51 in the network card 102 receives the CPU clear pointer from the CPU 101, and updates the currently stored CPU clear pointer with the received CPU clear pointer. The CPU clear pointer is thus updated. The network card 102 performs steps S51, S52 and S55 of FIG. 9, thereby clearing the completion status.

As described above, the descriptor controller 221 in the personal computer 100 determines whether the network card pointer and the CPU clear pointer match each other, i.e., whether the packet area 32 that corresponds to the packet used in the previously executed DMA transfer process and that has not undergone the DMA transfer completion process of the CPU 101 is present. If it is determined in step S32 that no such packet area 32 is present, the interrupt generator 122 clears the completion status. This process eliminates the need for the CPU 102 to access the network card 102 and to issue a request to clear the completion status. As a result, in comparison with the known art discussed with reference to FIG. 5, the interrupt process is simple and time to perform the interrupt process is short in the personal computer 100.

Figure 12:
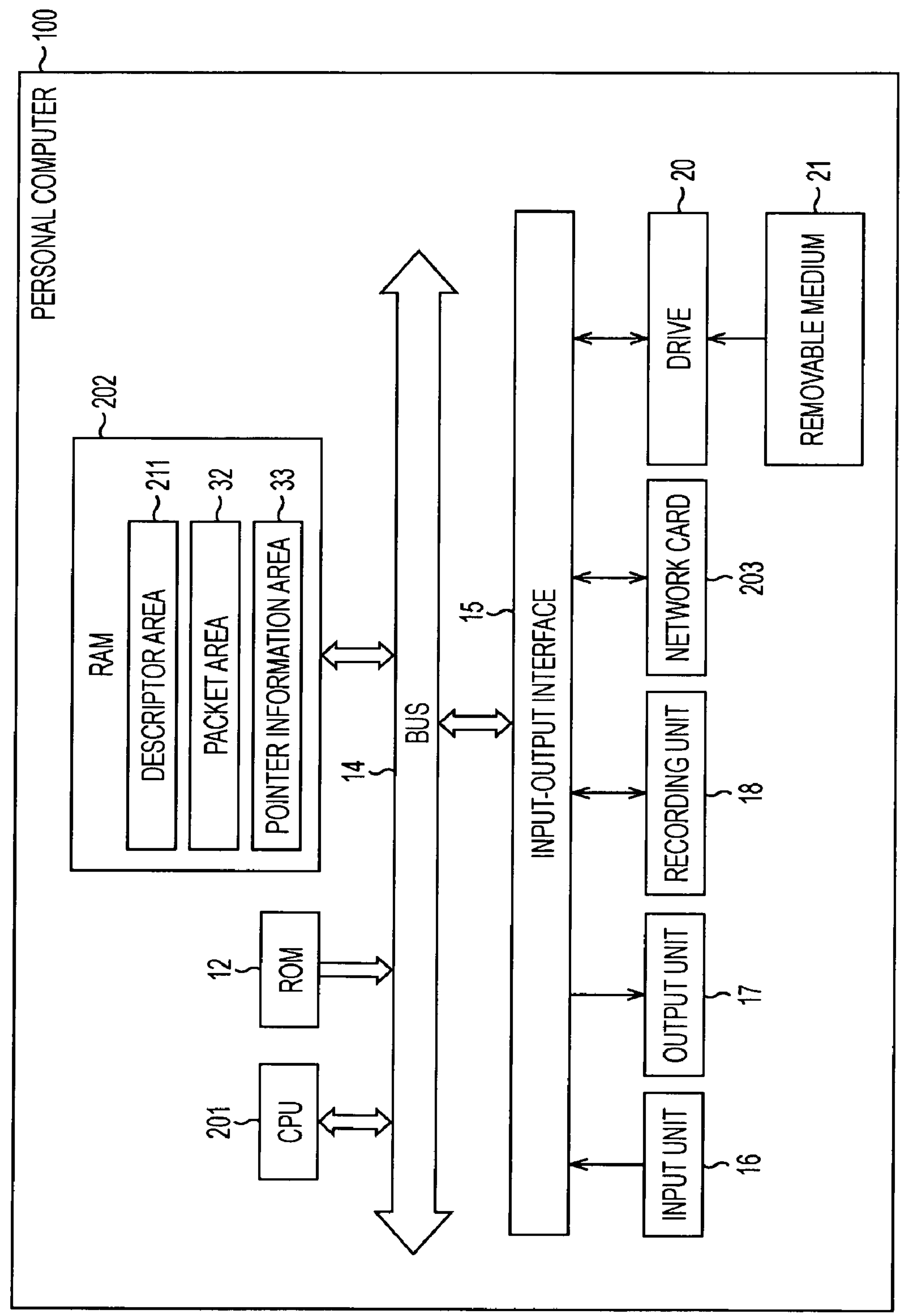
FIG. 12 is a block diagram illustrating a hardware structure of a personal computer in accordance with one embodiment of the present invention.

FIG. 12 is a block diagram illustrating a hardware structure of a personal computer 100 in accordance with one embodiment of the present invention. In FIG. 12, elements identical to those illustrated in FIG. 6 are designated with the same reference numerals and the discussion thereof is omitted.

A descriptor 240 (in FIG. 14 to be discussed later) employed in the personal computer 100 of FIG. 12 includes a DMA completed bit representing whether the DMA transfer process corresponding to the descriptor 240 has been completed (executed). For example, the DMA completed bit of the descriptor 240 is set to “1” if the DMA transfer process corresponding to the descriptor 240 has been completed and to “0” if the DMA transfer process corresponding to the descriptor 240 has not been completed.

The personal computer 100 of FIG. 12 includes the ROM 12, the bus 14, the input-output interface 15, the input unit 16, the output unit 17, the recording unit 18, the drive 20, a CPU 201, a RAM 202 and a network card 203. In accordance with the descriptor 240, a packet is transferred from the RAM 202 to the network card 203.

As the CPU 101 of FIG. 6, the CPU 201 of FIG. 12 causes a descriptor area 211 in the RAM 202 to store, as the descriptor 240, an address of a packet or the like stored on the packet area 32 in the RAM 202 to be DMA transferred. The CPU 201 thus causes the network card 102 to DMA transfer the packet.

The CPU 201 causes the pointer information area 33 in the RAM 202 to store the CPU set pointer. In response to the interrupt signal supplied from the network card 203, the CPU 201 performs, as an interrupt process to the completion status, the DMA transfer completion process such as a clear operation on the packet area 32 used in the descriptor 240 corresponding to the DMA transfer process performed by the network card 203. The CPU 201 causes the pointer information area 33 in the RAM 202 to store the CPU clear pointer.

The RAM 202 includes the packet area 32, the pointer information area 33 and the descriptor area 211 storing the descriptor 240.

As the network card 102 of FIG. 6, the network card 203 performs the DMA transfer process. The network card 203 sets the DMA completed bit of the descriptor 240 corresponding to the completed DMA transfer process to "1" indicating the completion of the DMA transfer process. The network card 203 further clears the completion status.

Figure 13:
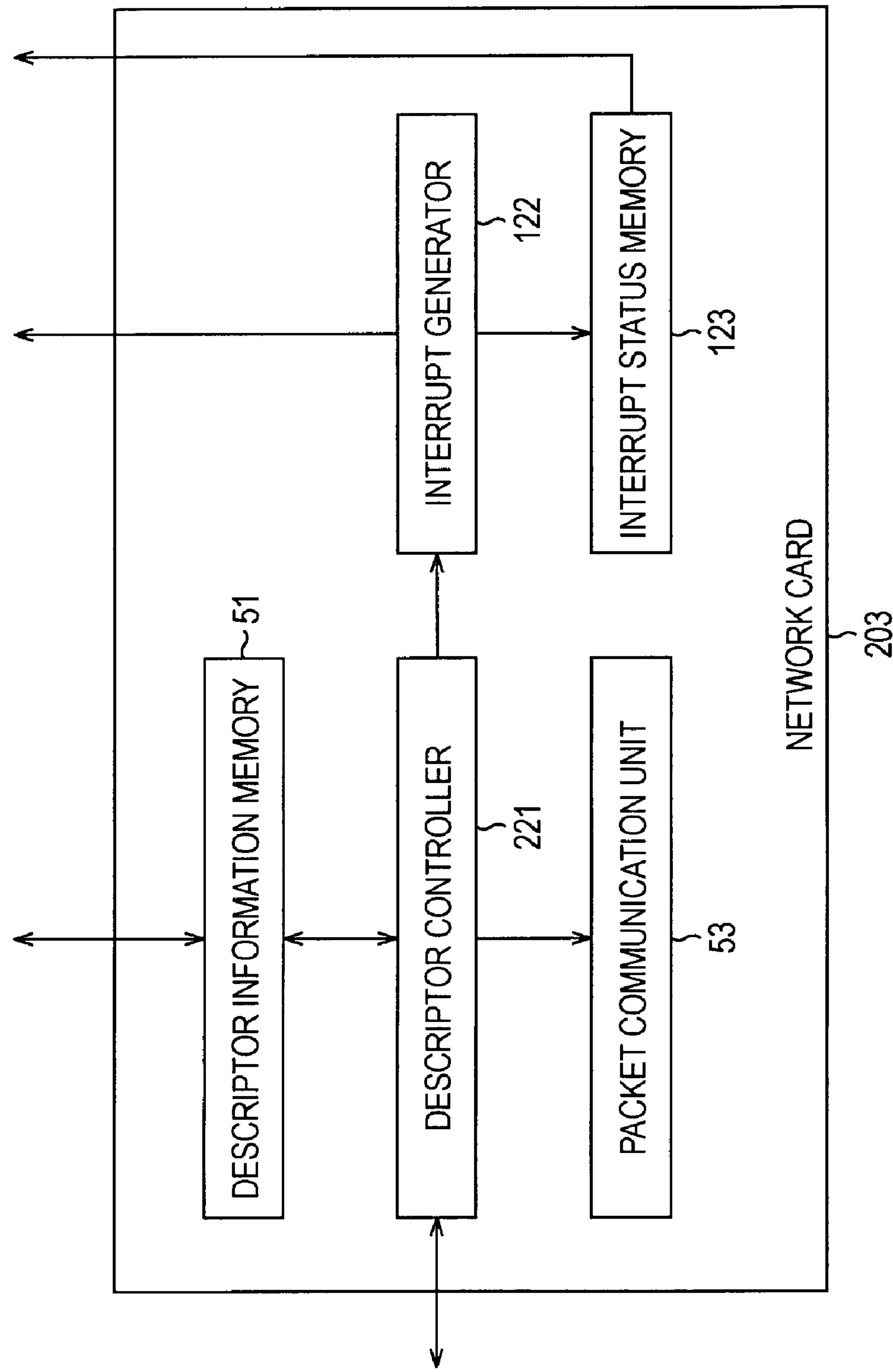
FIG. 13 is a block diagram illustrating in detail a network card of FIG. 12.

FIG. 13 is a block diagram illustrating in detail the structure of the network card 203 of FIG. 12. In FIG. 13, elements identical to those illustrated in FIG. 7 are designated with the same reference numerals.

As the descriptor controller 121 of FIG. 7, the descriptor controller 221 of FIG. 13 reads the network card pointer and the CPU set pointer from the packet communication unit 53 and determines the descriptor 240 corresponding to the DMA transfer process to be performed, based on the network card pointer and the CPU set pointer. In accordance with the descriptor 240, the descriptor controller 221 reads the packet as a target of the DMA transfer and supplies the read packet to the packet communication unit 53.

The descriptor controller 221 updates the network card pointer to be stored on the descriptor information memory 51 in response to the completion information supplied from the packet communication unit 53 and notifies the interrupt generator 54 of the completion of the DMA transfer process. In response to the completion information, the descriptor controller 221 further updates to "1" the DMA completed bit of the descriptor 240 on the descriptor area 211 corresponding to the DMA transfer process, the completion of which is indicated by the completion information.

The descriptor controller 221 reads the network card pointer and the CPU clear pointer from the descriptor information memory 51 and instructs the interrupt generator 122 to set or clear the completion status in accordance with the network card pointer and the CPU clear pointer.

Figure 3:
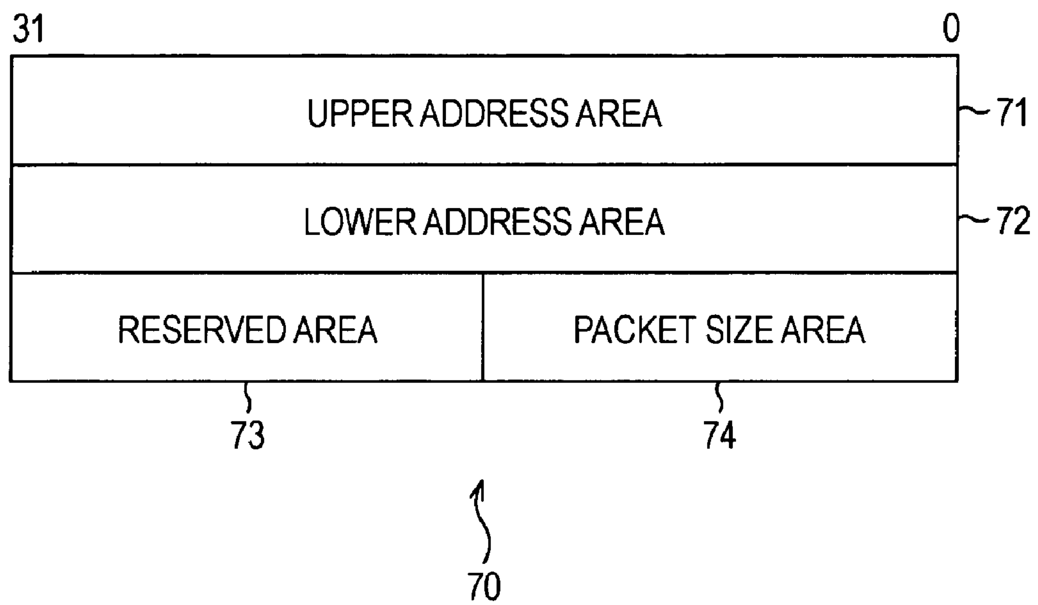
FIG. 3 illustrates an example of a descriptor.
Figure 4:
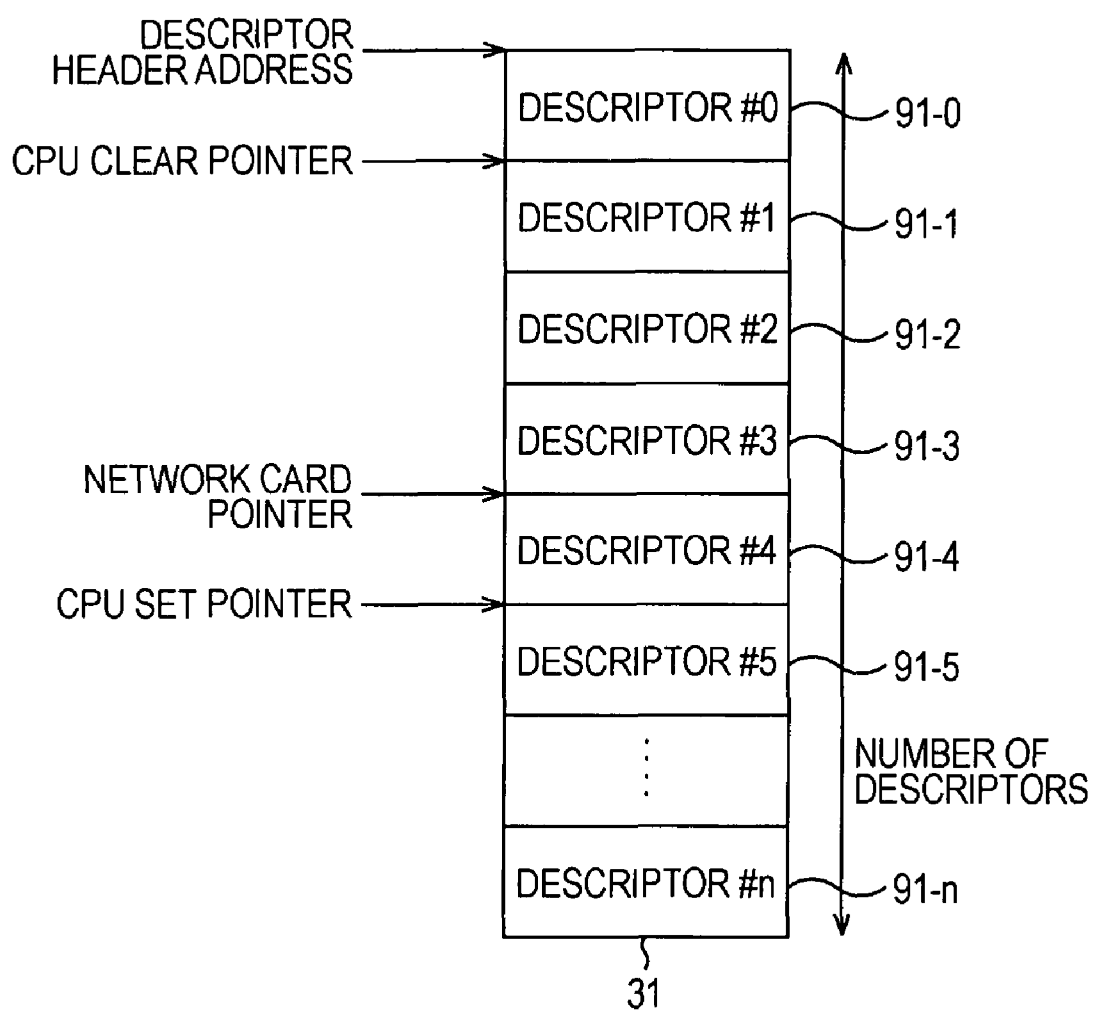
FIG. 4 illustrates information stored on a descriptor memory.
Figure 14:
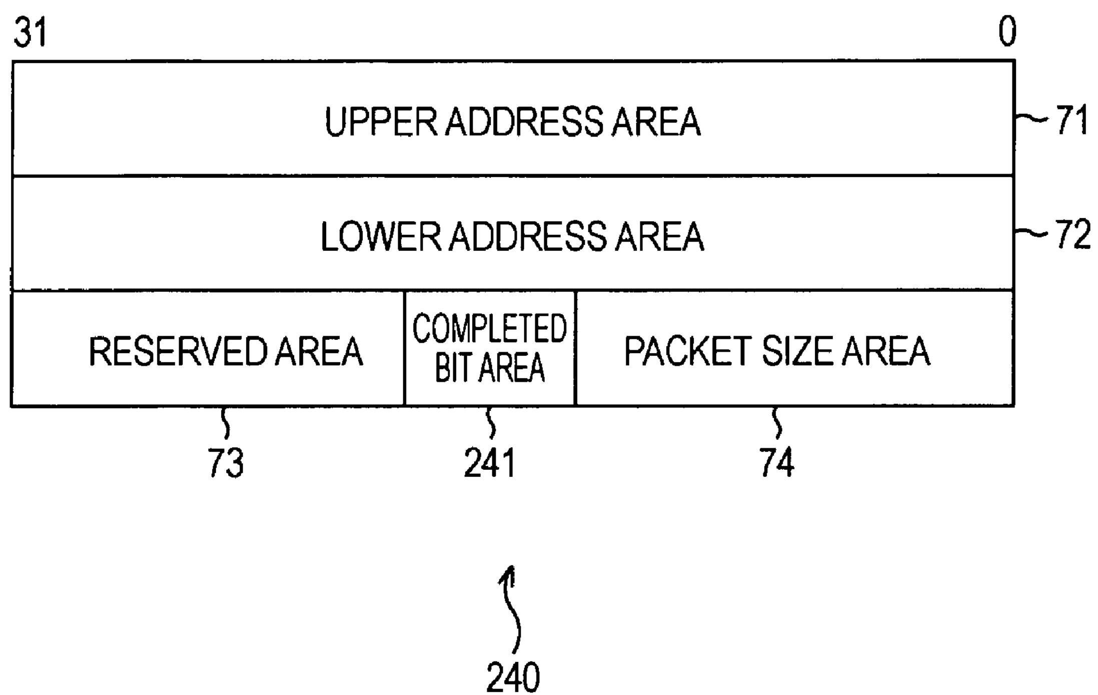
FIG. 14 illustrates an example of a descriptor.

With reference to FIG. 14, the descriptor 240 stored on the descriptor area 211 is described. In FIG. 14, elements identical to those illustrated in FIG. 3 are designated with the same reference numerals.

The descriptor 240 of FIG. 14 contains the upper address area 71, the lower address area 72, the reserved area 73, the packet size area 74 and a completed bit area 241.

The completed bit area 241 stores the DMA completed bit. When the CPU 202 produces the descriptor 240, the completed bit area 241 stores, as the DMA completed bit, "0" indicating that the DMA transfer process corresponding to the descriptor 240 has not been completed.

The descriptor controller 221 updates from "0" to "1" the DMA completed bit of the descriptor 240 on the descriptor area 211 corresponding to the DMA transfer process with the completion information thereof indicating the completion.

Figure 15:
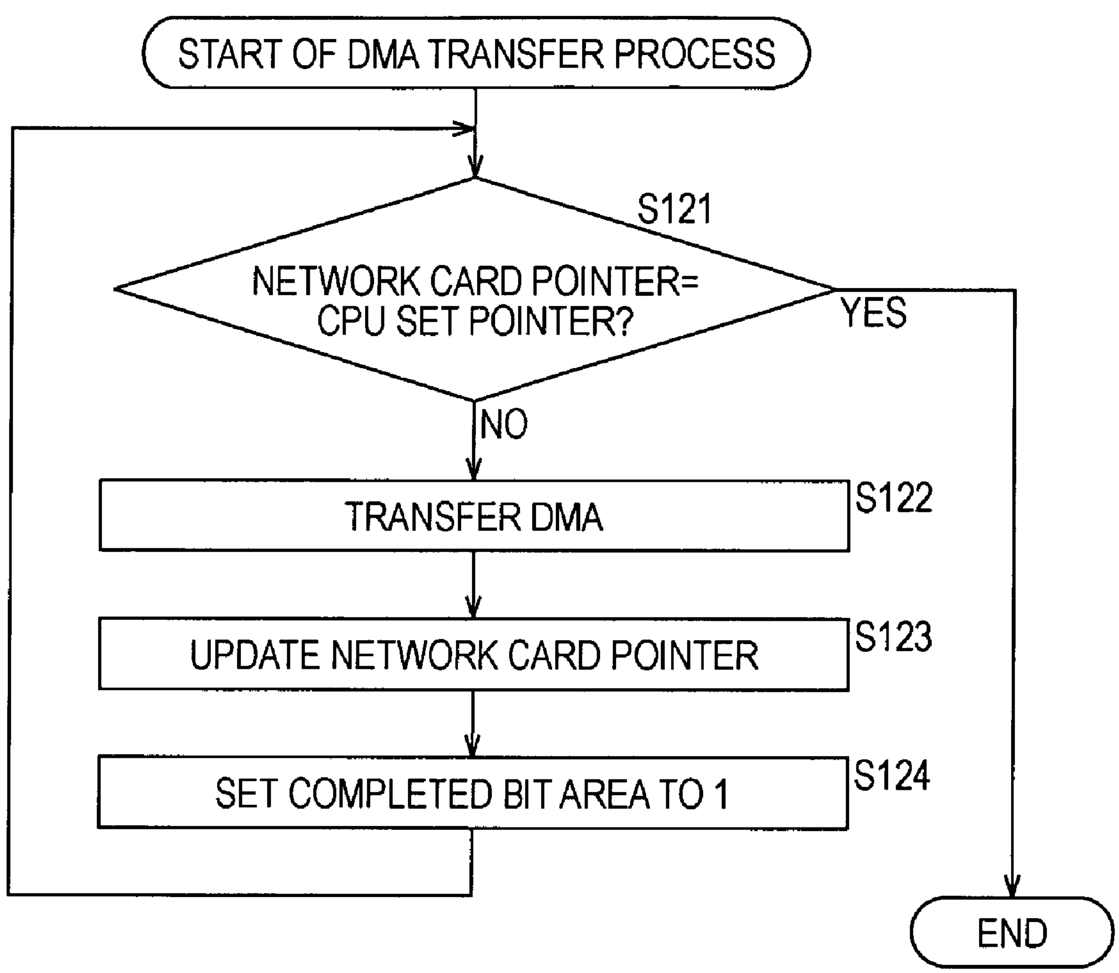
FIG. 15 is a flowchart illustrating a DMA transfer process of the network card.

The DMA transfer process of the network card 203 is described below with reference to FIG. 15. The DMA transfer process is initiated when the CPU set pointer supplied from the CPU 201 is stored onto the descriptor information memory 51.

Steps S121 through S123 are identical to steps S31 through S32 of FIG. 8, and the discussion thereof is omitted herein.

Processing proceeds from step S123 to step S124. The descriptor controller 221 sets the DMA completed bit of the descriptor 240 corresponding to the DMA transfer process performed in step S122 to "1." Processing returns to step S121.

A release RAM process of the CPU 201 is described below with reference to FIG. 16. The release RAM process is initiated when the interrupt signal is supplied from the CPU 201 with the interrupt status being the completion status.

In step S141, the CPU 201 reads from the pointer information area 33 in the RAM 202 the CPU set pointer and the CPU clear pointer as pointer information and proceeds to step S142.

In step S142, the CPU 201 reads from the descriptor area 211 the descriptor 240, as a DMA transfer completion process candidate, stored at the address represented by the CPU clear pointer, and proceeds to step S143.

In step S143, the CPU 201 determines whether the DMA completed bit stored on the completed bit area 241 of the descriptor 240 as the DMA transfer completion process candidate is "1." If it is determined in step S143 that the DMA completed bit is "1," i.e., that the descriptor 240 as the DMA transfer completion process candidate corresponds to the DMA transfer process previously executed by the network card 203 and that the DMA transfer completion process has not been performed to the packet area 32 used in the descriptor 240 is present, processing proceeds to step S144.

In step S144, the CPU 201 performs the DMA transfer completion process such as a clear operation to the packet area 32 corresponding to the descriptor 240 as the DMA transfer completion process candidate, and proceeds to step S145.

In step S145, the CPU 201 updates the CPU clear pointer stored on the pointer information area 33 in the RAM 202 to an address of a next descriptor 240 subsequent to the descriptor 240 corresponding to the packet area 32 having undergone the DMA transfer completion process in step S144. Processing proceeds to step S146.

In step S146, the CPU 201 determines whether the CPU clear pointer updated in step S145 matches the CPU set pointer. If it is determined in step S145 that the CPU clear pointer does not match the CPU set pointer, processing returns to step S142.

If it is determined in step S143 that the DMA completed bit is not "1," or if it is determined in step S146 that the CPU clear pointer matches the CPU set pointer, processing proceeds to step S147. As in step S77 of FIG. 10, the CPU 102 reads the CPU clear pointer stored on the pointer information area 33 in the RAM 202 and supplies the read CPU clear pointer to the descriptor information memory 51. The CPU 102 thus requests the descriptor information memory 51 to update the CPU clear pointer and ends the process.

Figure 17:
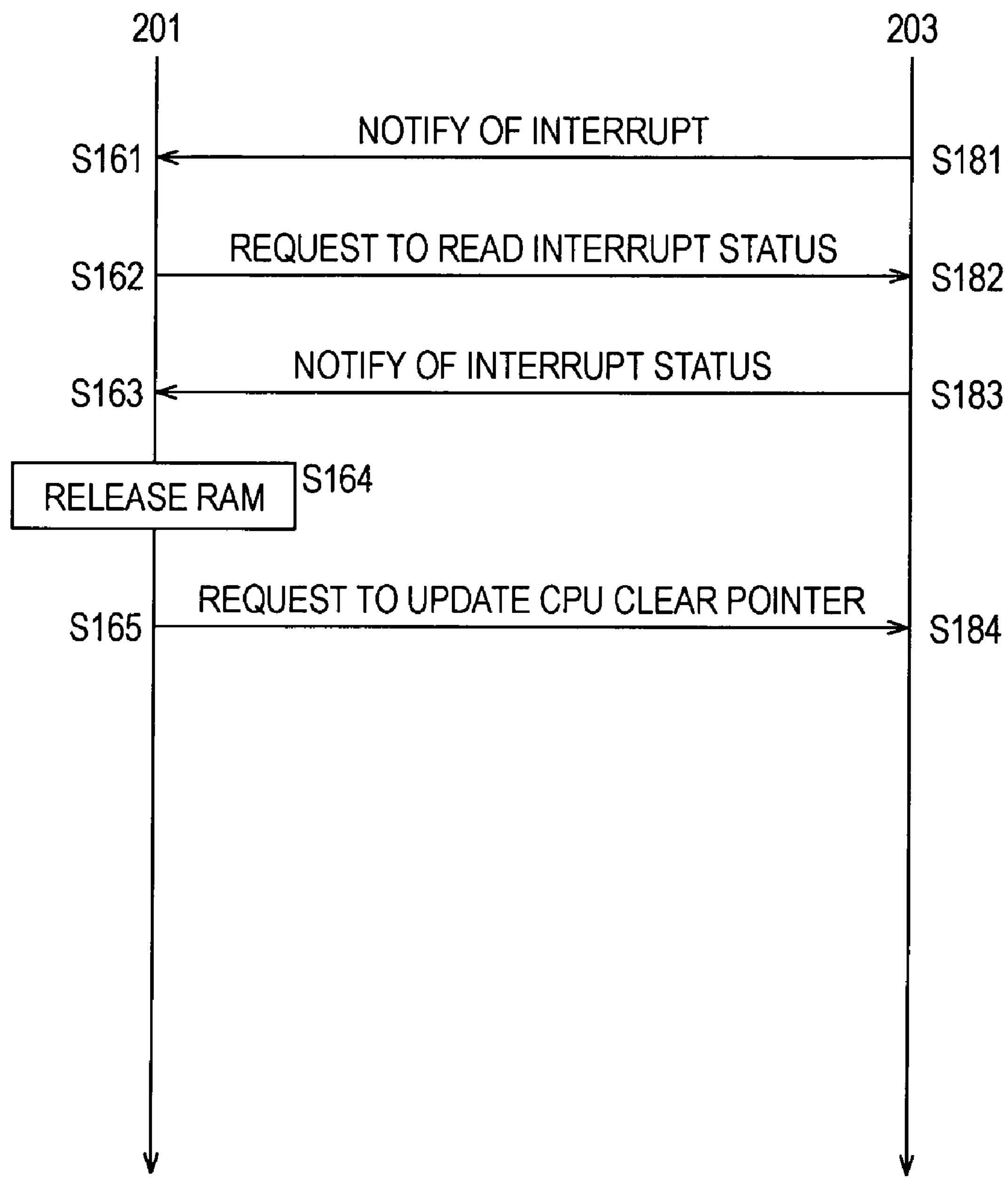
FIG. 17 is a flowchart illustrating an interrupt process of the personal computer of FIG. 12.

The interrupt process of the personal computer 100 of FIG. 12 is described below with reference to FIG. 17.

Figure 11:
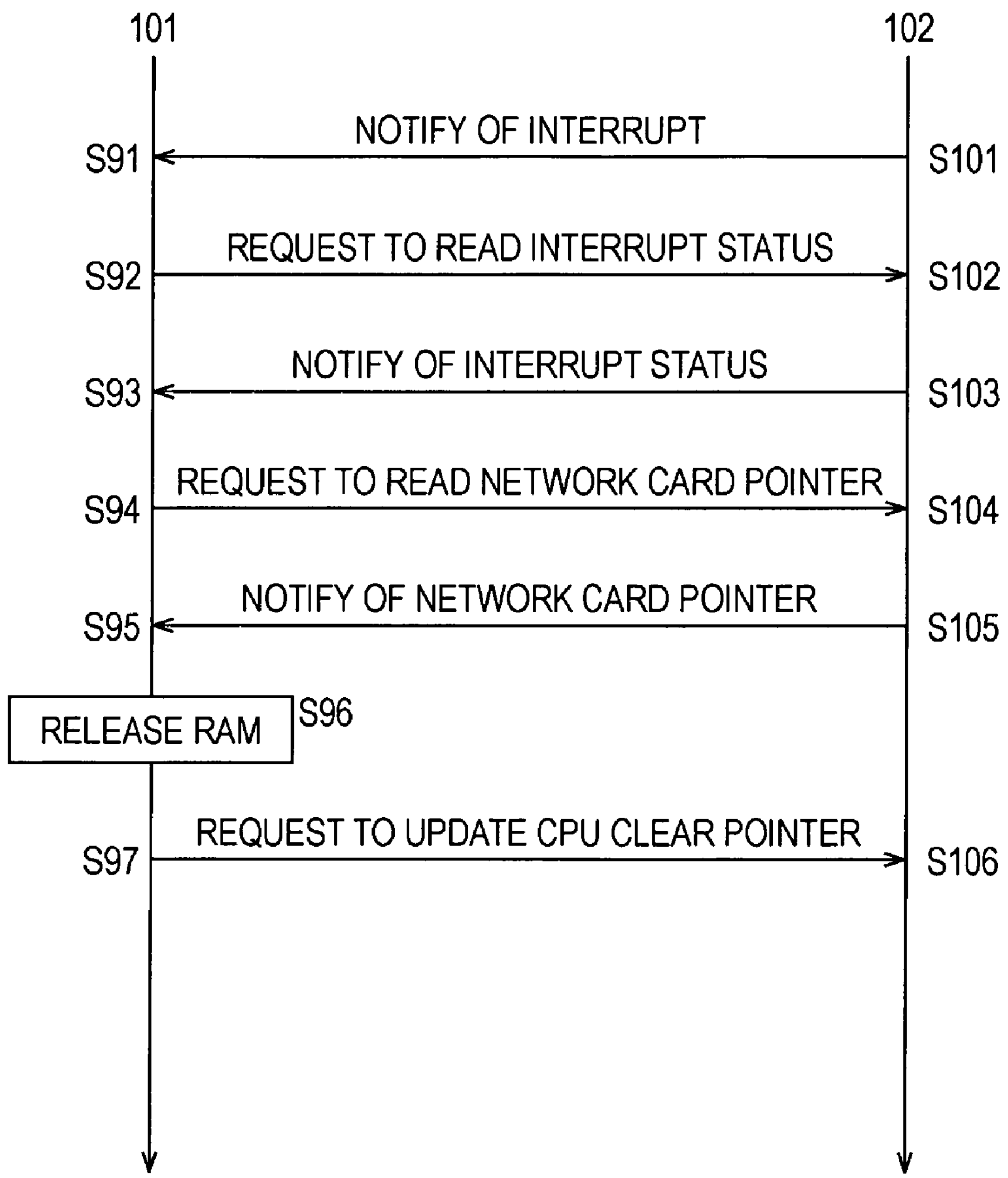
FIG. 11 is a flowchart illustrating an interrupt process of the personal computer.

Steps S181 through S183 are identical to steps S101 through S103 of FIG. 11, and the discussion thereof is omitted herein. Steps S161 through S163 are identical to steps S91 through S93 of FIG. 11, and the discussion thereof is omitted herein.

Figure 16:
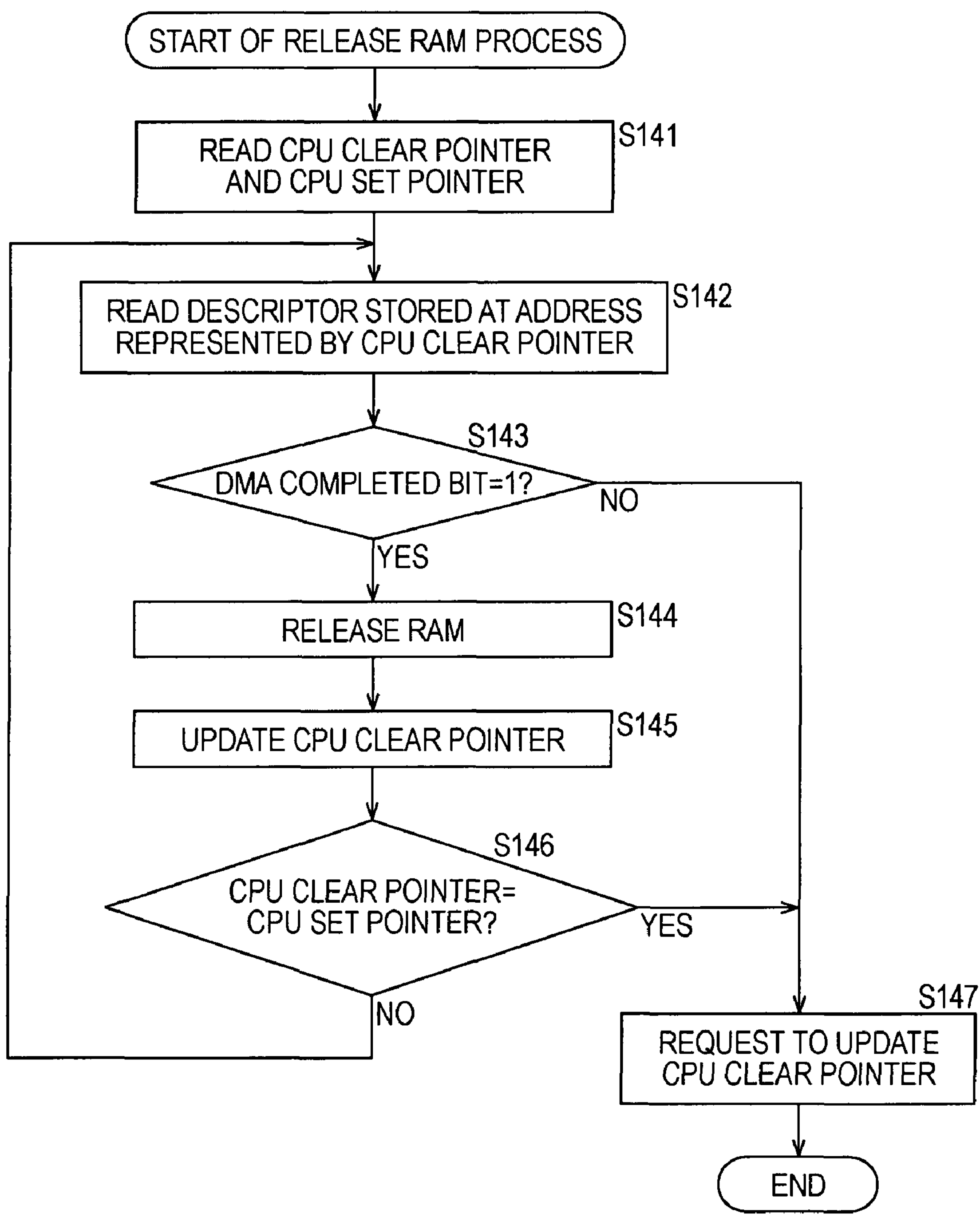
FIG. 16 is a flowchart illustrating a release RAM process performed by a CPU.

In step S164, the CPU 201 performs steps S141 through S146 of FIG. 16, thereby releasing the packet area 32 in the RAM 202. Processing proceeds to step S165.

As in step S97 of FIG. 11, in step S165, the CPU 201 performs step S147 of FIG. 16 to request to update the CPU clear pointer. The process thus ends.

Processing proceeds from step S183 to step S184. As in step S106 of FIG. 11, the descriptor information memory 51 in the network card 203 receives from the CPU 201 the CPU clear pointer to update the current CPU clear pointer. The network card 203 performs steps S51, S52 and S55 of FIG. 9, thereby clearing the completion status.

Since the personal computer 100 of FIG. 12 stores the DMA completed bit on the completed bit area 241 of the descriptor 240 as described above, there is no need for the CPU 201 to access the network card 203 to request the network card 203 to read the network card pointer. As a result, the interrupt process is more simplified and the time required to perform the interrupt process is shorter in the personal computer 100 of FIG. 12 than in the personal computer 100 of FIG. 6.

Devices performing one of the descriptor 70 and the descriptor 240 is not limited to one of the network card 102 and the network card 203. The devices may be a data storage device.

As described above, the interrupt generator 122 (221) in the network card 102 (203) determines whether the packet area 32 corresponding to the packet used in the executed DMA transfer process and having not undergone the DMA transfer completion process is present. If it is determined that the packet area 32 corresponding to the packet used in the executed DMA transfer process and having not undergone the DMA transfer completion process is present, the descriptor controller 121 (221) causes the interrupt generator 122 to generate the interrupt signal and sets the completion status as the interrupt status. If it is determined that the packet area 32 corresponding to the packet used in the executed DMA transfer process and having not undergone the DMA transfer completion process is not present, the descriptor controller 121 (221) causes the interrupt generator 122 to clear the completion status. The interrupt process is thus simplified and the time required to perform the interrupt status is shortened.

In the specification, the process steps describing the program for causing the computer to perform a variety of processes are not necessarily performed in the time-series order stated in the flowcharts. The process steps may be performed in parallel or separately (for example, in a parallel operation or in a process using an object).

The program may be executed using a single computer or using a plurality of computers in a distributed fashion. The program may be transmitted to a remote location and then executed there.

The invention claimed is:

1. An information processing apparatus comprising:

data storage means for storing predetermined data, executing means for executing a data process on the data in accordance with processing information for executing the data process on the data, generating means for generating an interrupt signal, clearing means for clearing the data storage means in accordance with the interrupt signal generated by the generating means, the generating means including:

determining means for determining whether the data storage means corresponding to the data used in the data process executed by the executing means and not yet cleared by the clearing means is present, and interrupt control means for generating the interrupt signal and setting a predetermined status to the interrupt signal if the determining means determines that the data storage means corresponding to the data used in the data process executed by the executing means and not yet cleared by the clearing means is present, and clearing the predetermined status if the determining means determines that the data storage means corresponding to the data used in the data process executed by the executing means and not yet cleared by the clearing means is not present.

2. An information processing apparatus including data storage means storing predetermined data, comprising:

executing means for executing a data process on the data in accordance with processing information for executing the data process on the data, determining means for determining whether the data storage means corresponding to the data used in the data process executed by the executing means and not yet cleared is present, and interrupt control means for generating an interrupt signal and setting a predetermined status to the interrupt signal if the determining means determines that the data storage means corresponding to the data used in the data process executed by the executing means and not yet cleared is present, and clearing the predetermined status if the determining means determines that the data storage means corresponding to the data used in the data process executed by the executing means and not yet cleared is not present.

3. The information processing apparatus according to claim 2, further comprising execution/clear process information storage means for storing, as process information, execution process information corresponding to the data process executed by the executing means and clear process information corresponding to the already cleared data storage means, wherein the determining means performs the determination operation thereof, based on the execution process information and the clear process information stored on the execution/clear process information storage means.

4. The information processing apparatus according to claim 2, wherein the process information contains execution information indicating whether the data process corresponding to the process information has been executed, wherein the executing means updates the execution information contained in the process information if the executing means has executed the data process corresponding to the process information, and wherein the determining means determines the determination operation thereof based on the execution information.

5. An information processing method of an information processing apparatus including data storage means storing predetermined data, comprising:

an executing step of executing a data process on the data in accordance with processing information for executing the data process on the data, a determining step of determining whether the data storage means corresponding to the data used in the data process executed in the executing step and not yet cleared is present, and an interrupt control step of generating an interrupt signal and setting a predetermined status to the interrupt signal if the determining step indicates that the data storage means corresponding to the data used in the data process executed in the executing step and not yet cleared is present, and clearing the predetermined status if the determining step indicates that the data storage means corresponding to the data used in the data process executed in the executing step and not yet cleared is not present.

6. A non-transitory computer-readable storage medium storing a computer program which, when executed by an information processing apparatus including data storage means storing predetermined data causes the apparatus to perform a method, the method comprising:

an executing step of executing a data process on the data in accordance with processing information for executing the data process on the data, a determining step of determining whether the data storage means corresponding to the data used in the data process executed in the executing step and not yet cleared is present, and an interrupt control step of generating the interrupt signal and setting a predetermined status to the interrupt signal if the determining step indicates that the data storage means corresponding to the data used in the data process executed in the executing step and not yet cleared is present, and clearing the predetermined status if the determining step indicates that the data storage means corresponding to the data used in the data process executed in the executing step and not yet cleared is not present.

* * * * *